(12) United States Patent
Park et al.

(10) Patent No.: US 12,646,776 B2
(45) Date of Patent: Jun. 2, 2026

(54) CELL ASSEMBLY TO WHICH LONGITUDINAL EXTENSION STRUCTURE OF POUCH BATTERY CELL IS APPLIED AND BATTERY PACK INCLUDING THE SAME

(71) Applicant: LG ENERGY SOLUTION, LTD., Seoul (KR)

(72) Inventors: Jin-Yong Park, Daejeon (KR); Jae-Min Yoo, Daejeon (KR); Ho-June Chi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 776 days.

(21) Appl. No.: 17/940,963

(22) Filed: Sep. 8, 2022

(65) Prior Publication Data

US 2023/0070149 A1     Mar. 9, 2023

(30) Foreign Application Priority Data

Sep. 9, 2021 (KR) ......................... 10-2021-0120657
Jul. 8, 2022 (KR) ......................... 10-2022-0084492

(51) Int. Cl.
*H01M 50/211* (2021.01)
*H01M 50/105* (2021.01)
(Continued)

(52) U.S. Cl.
CPC ....... *H01M 50/211* (2021.01); *H01M 50/105* (2021.01); *H01M 50/178* (2021.01); *H01M 50/284* (2021.01); *H01M 50/569* (2021.01)

(58) Field of Classification Search
CPC ............. H01M 50/211; H01M 50/569; H01M 50/178; H01M 50/105; H01M 50/284
See application file for complete search history.

(56) References Cited

U.S. PATENT DOCUMENTS

2011/0003197 A1* 1/2011 Kritzer ................ H01M 10/647
429/185
2016/0197332 A1 7/2016 Lee et al.
(Continued)

FOREIGN PATENT DOCUMENTS

CN 111477803 A 7/2020
CN 111697191 A 9/2020
(Continued)

OTHER PUBLICATIONS

KR10-2020-0029308 MT (Year: 2020).*
(Continued)

*Primary Examiner* — Alexander Usyatinsky
(74) *Attorney, Agent, or Firm* — Bryan Cave Leighton Paisner LLP

(57) ABSTRACT

A cell assembly includes a first cell sleeve and a first battery cell in a first section of the first cell sleeve. The cell assembly further includes a second battery cell in a second section of the cell sleeve and a first connector between the first battery cell and the second battery cell. The first connector electrically connects the first battery cell and the second battery cell. The first battery cell includes a first electrode tab at a first side of the first battery cell and a second electrode tab at a second side of the first battery cell. The second battery cell includes a third electrode tab at a first side of the second battery cell and a fourth electrode tab at a second side of the second battery cell.

19 Claims, 29 Drawing Sheets

(51) Int. Cl.

| | |
|---|---|
| *H01M 50/178* | (2021.01) |
| *H01M 50/284* | (2021.01) |
| *H01M 50/569* | (2021.01) |

(56) References Cited

U.S. PATENT DOCUMENTS

| | | | |
|---|---|---|---|
| 2018/0048033 | A1 | 2/2018 | Lee et al. |
| 2018/0175346 | A1* | 6/2018 | Schmid-Schoenbein .................... H01M 50/553 |
| 2018/0375077 | A1* | 12/2018 | Shin .................. H01M 10/6554 |
| 2019/0273288 | A1* | 9/2019 | Jaensch .............. H01M 10/655 |
| 2020/0185672 | A1* | 6/2020 | Seo ................... H01M 10/6568 |
| 2020/0365844 | A1 | 11/2020 | Jeon et al. |
| 2020/0411814 | A1 | 12/2020 | Ju et al. |
| 2021/0020879 | A1 | 1/2021 | Lee |
| 2021/0255863 | A1 | 8/2021 | Dang et al. |
| 2021/0288385 | A1 | 9/2021 | Jin et al. |
| 2024/0421443 | A1 | 12/2024 | Jin et al. |

FOREIGN PATENT DOCUMENTS

| | | | | |
|---|---|---|---|---|
| CN | 111900302 | A | 11/2020 | |
| CN | 212342772 | U | 1/2021 | |
| CN | 212625868 | U | 2/2021 | |
| CN | 113161672 | A | 7/2021 | |
| CN | 113193259 | A | 7/2021 | |
| CN | 113335080 | A * | 9/2021 | .......... H01M 50/547 |
| EP | 2991133 | A1 | 2/2016 | |
| EP | 3813141 | A1 | 4/2021 | |
| JP | 2019-508870 | A | 3/2019 | |
| KR | 10-2013-0135126 | A | 12/2013 | |
| KR | 10-2015-0022468 | A | 3/2015 | |
| KR | 10-2015-0044599 | A | 4/2015 | |
| KR | 10-2016-0112768 | A | 9/2016 | |
| KR | 10-2018-0112618 | A | 10/2018 | |
| KR | 10-2019-0032019 | A | 3/2019 | |
| KR | 10-2019-0074759 | A | 6/2019 | |
| KR | 10-20094430000 | B1 | 8/2019 | |
| KR | 10-2020-0029306 | A | 3/2020 | |
| KR | 10-2020-0029307 | A | 3/2020 | |
| KR | 10-2020-0029308 | A | 3/2020 | |
| KR | 10-2020-0030966 | A | 3/2020 | |
| KR | 20200029308 | A * | 3/2020 | .......... H01M 10/425 |
| KR | 20200030966 | A * | 3/2020 | .......... H01M 10/653 |
| KR | 10-2020-0104620 | A | 9/2020 | |
| KR | 10-2020-0131500 | A | 11/2020 | |
| WO | 2020138847 | A1 | 7/2020 | |

OTHER PUBLICATIONS

KR_20200030966_MT (Year: 2020).*
The decision of KPO to grant a Patent for Application KR 1020220084492 (Year: 2025).*
The decision of JPO to grant a Patent for Application JP2023528745 (Year: 2025).*

* cited by examiner (a)

CELL ASSEMBLY TO WHICH LONGITUDINAL EXTENSION STRUCTURE OF POUCH BATTERY CELL IS APPLIED AND BATTERY PACK INCLUDING THE SAME

CROSS-REFERENCE TO RELATED APPLICATION(S) TECHNICAL FIELD

The present application claims priority to and the benefit of Korean Patent Application No. 10-2021-0120657 filed on Sep. 9, 2021 and No. 10-2022-0084492 filed on Jul. 8, 2022 in the Republic of Korea, the disclosures of which are incorporated herein by reference in their entirety.

TECHNICAL FIELD

The present disclosure relates to a battery, and more particularly, to a cell assembly configured to directly mount pouch-type battery cells in a pack case, and a battery pack including the same.

BACKGROUND

A secondary battery is attracting attention as a new energy source for improving eco-friendliness and energy efficiency because of its advantages in being able to dramatically reduce the use of fossil fuels while generating little or no by-products from the use of energy.

Accordingly, the application of secondary batteries in various devices is increasing. For example, secondary batteries are widely used, not only as an energy source for wireless mobile devices or wearable devices, which are multifunctional small products, but also as an energy source for electric vehicles and hybrid electric vehicles instead of conventional gasoline and diesel vehicles or an energy storage system (ESS).

In general, a secondary battery has an operating voltage of about 2.5V to 4.5V. Therefore, in the case of an electric vehicle or an energy storage system requiring large capacity and high output, a battery module in which a plurality of secondary batteries are connected in series and/or in parallel and a battery pack in which the battery modules are connected in series and/or in parallel are configured and then used as an energy source. That is, a conventional battery pack includes a battery module as a sub-assembly thereof, and the battery module includes a battery cell as a sub-assembly thereof. In addition, the number of battery cells included in the battery module or the number of battery modules included in the battery pack may be variously determined according to the output or capacity of the battery pack required for an electric vehicle.

A pouch-type battery cell has advantages in various aspects such as light weight and small dead space during stacking, but is vulnerable to external shocks and poor in assembling. Therefore, in the case of a battery pack employing a pouch-type battery cell, the stacked pouch-type battery cells are electrically connected to each other and packaged into a module case to manufacture a battery module, and then one or more of these battery modules are accommodated in a pack case. As an example, in a battery module included in the conventional battery pack, as disclosed in the following prior literature (Korean Unexamined Patent Publication No. 10-2015-0044599), or the like, a plurality of pouch-type battery cells are stacked using various components such as a stacking frame made of a plastic material, which is called a cartridge, plates provided at both ends in the cell stacking direction, and a fastening member such as a bolt to form a cell stack, and then the cell stack is accommodated inside the module case again.

In the case of a conventional battery pack including such battery modules, it may be disadvantageous in terms of energy density. For example, in the process of accommodating a plurality of battery cells inside the module case to form a module, various components such as the module case or the stacking frame may unnecessarily increase the volume of the battery module or reduce the space to be occupied by the battery cells. Moreover, the storage space of the battery cell may be reduced in order to ensure the space occupied by the components themselves, such as the module case or the stacking frame, as well as assembly tolerances for these components. Therefore, when assembling a battery pack using the above-described battery modules, there is a limit in increasing the energy density.

In addition, in a conventional battery pack, since the module case is accommodated inside the pack case and the battery cells are accommodated inside the module case, there is also a problem in that it is difficult to ensure excellent or desired cooling properties. In particular, when the heat generated from the battery cells accommodated inside the module case is discharged out of the pack case through the module case, the cooling efficiency may deteriorate and the cooling structure may be complicated.

However, as the electric vehicle market grows rapidly, the performance of the electric vehicles and the maximum driving distance when fully charged are becoming more important. For this reason, there is a growing need for a new battery pack having higher energy capacity and superior battery cooling performance compared to the conventional battery pack. For increasing the energy capacity, CTP (Cell To Pack, which means a method of assembling the battery cells directly inside the case of the battery pack by omitting the battery module unit) type battery pack has recently become an issue, but until recently, there has been no suitable method for mounting a battery cell in a pack case in a CTP type.

The present disclosure is directed to overcoming one or more of these challenges. The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

SUMMARY OF DISCLOSURE

According to certain aspects of the disclosure, a cell assembly, a battery pack, and a vehicle including the battery pack and methods of manufacturing the same for improving the energy density, cooling properties, and manufacturing processes are provided in this disclosure.

In one embodiment, a cell assembly may include a first cell sleeve and a first battery cell in a first section of the first cell sleeve. The cell assembly may further include a second battery cell in a second section of the cell sleeve and a first connector between the first battery cell and the second battery cell. The first connector may electrically connect the first battery cell and the second battery cell. The first battery cell may comprise a first electrode tab at a first side of the first battery cell and a second electrode tab at a second side of the first battery cell. The second battery cell may comprise a third electrode tab at a first side of the second battery cell and a fourth electrode tab at a second side of the second battery cell.

In another embodiment, a battery pack may include a case having an inner surface and a plurality of cell assemblies on the inner surface. Each of the plurality of cell assemblies may include a cell sleeve, a first battery cell in a first section of the cell sleeve, a second battery cell in a second section of the cell sleeve, and a connector between the first battery cell and the second battery cell. The connector may electrically connect the first battery cell and the second battery cell. The battery pack may further include a voltage sensor on the plurality of cell assemblies. The voltage sensor may be electrically connected to the connector in each of the plurality of cell assemblies. The battery pack may further include a cover covering the plurality of cell assemblies.

In yet another embodiment, a method of manufacturing a cell assembly may be provided. The method may include the steps of: providing a cell sleeve; inserting a first battery cell in a first section of the first cell sleeve, the first battery cell comprising a first electrode tab at a first side of the first battery cell and a second electrode tab at a second side of the first battery cell; inserting a second battery cell in a second section of the cell sleeve, the second battery cell comprising a third electrode tab at a first side of the second battery cell and a fourth electrode tab at a second side of the second battery cell; and electrically connecting the first battery cell and the second battery cell with a connector.

It is to be understood that both the foregoing general description and the following detailed description are exemplary and explanatory and are not restrictive of the disclosed embodiments, as claimed.

BRIEF DESCRIPTION OF DRAWINGS

The accompanying drawings illustrate a preferred embodiment of the present disclosure and together with the foregoing disclosure, serve to provide further understanding of the technical features of the present disclosure, and thus the present disclosure is not construed as being limited to the drawing.

FIG. 9 is a view of the central region of the cell assembly of FIG. 8 as viewed from the bottom.

FIG. 20 is a view of the central region of the cell assembly of FIG. 18 as viewed from the bottom.

DETAILED DESCRIPTION

Figure 1:
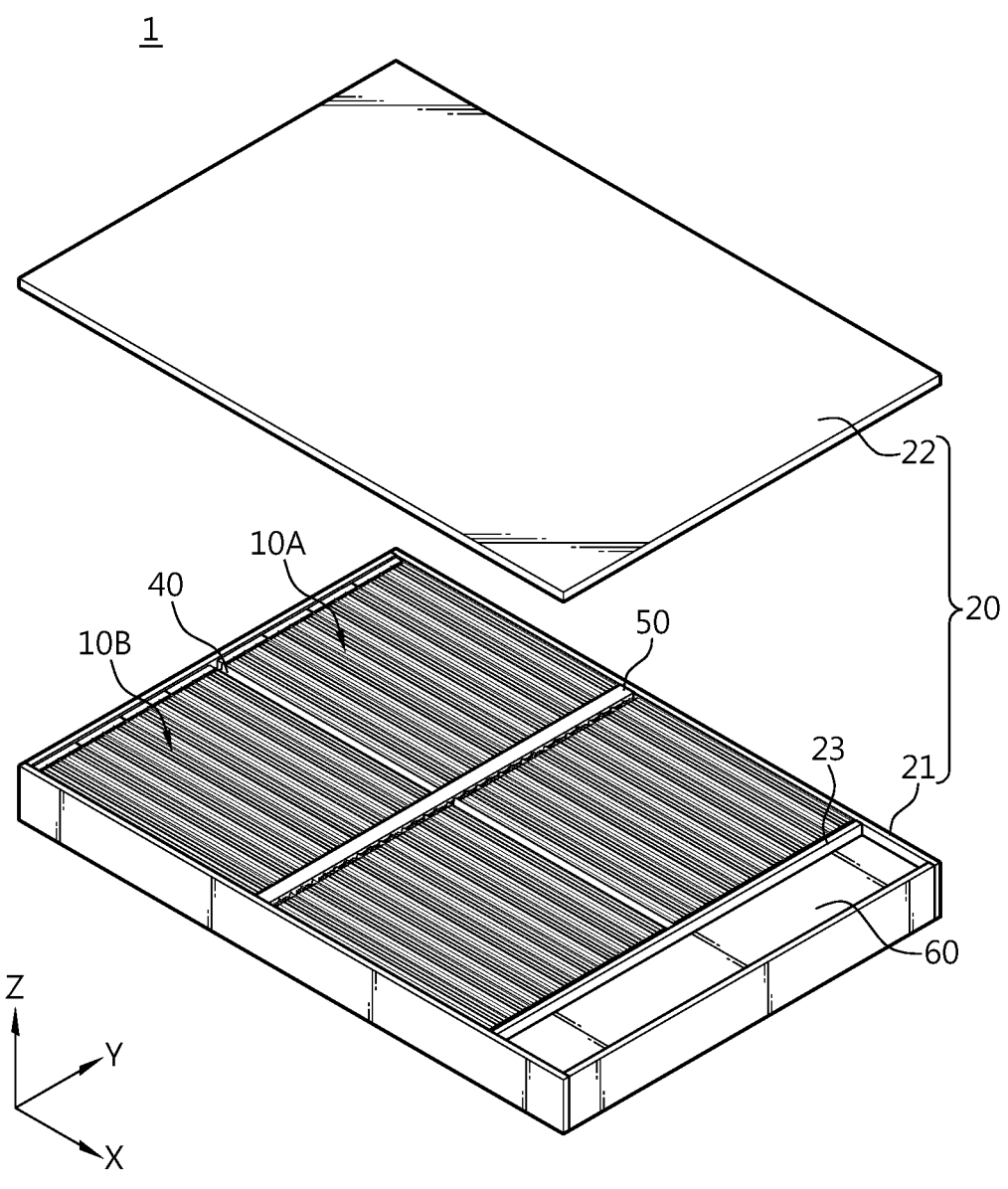
FIG. 1 is a perspective view schematically illustrating a configuration of a battery pack according to an embodiment of the present disclosure.

Further aspects, features, and advantages of the present disclosure will become apparent from the detailed description which follows.

As used herein, the singular forms "a", "an" and "the" are intended to include the plural forms as well, unless the context clearly indicates otherwise. Additionally, the use of "or" is intended to include "and/or" and not the "exclusive" sense of "either/or, unless the context clearly indicates otherwise.

As used herein, "about" is a term of approximation and is intended to include minor variations in the literally stated amounts, as would be understood by those skilled in the art. Such variations include, for example, standard deviations associated with techniques commonly used to measure the amounts of the constituent elements or components of an alloy or composite material, or other properties and characteristics. All of the values characterized by the above-described modifier "about," are also intended to include the exact numerical values disclosed herein. Moreover, all ranges include the upper and lower limits.

Any compositions described herein are intended to encompass compositions which consist of, consist essentially of, as well as comprise, the various constituents identified herein, unless explicitly indicated to the contrary.

As used herein, the recitation of a numerical range for a variable is intended to convey that the variable can be equal to any value(s) within that range, as well as any and all sub-ranges encompassed by the broader range. Thus, the variable can be equal to any integer value or values within the numerical range, including the end-points of the range. As an example, a variable which is described as having values between 0 and 10, can be 0, 4, 2-6, 2.75, 3.19-4.47, etc.

Unless indicated otherwise, each will of the individual features or embodiments of the present specification are combinable with any other individual feature or embodiment that are described herein, without limitation. Such combinations are specifically contemplated as being within the scope of the present disclosure, regardless of whether they are explicitly described as a combination herein.

Technical and scientific terms used herein have the meaning commonly understood by one of skill in the art to which the present description pertains, unless otherwise defined. Reference is made herein to various methodologies and materials known to those of skill in the art.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover or sleeve a non-exclusive inclusion such that a process, method, or product that comprises a list of elements does not necessarily include only those elements, but may include other elements not expressly listed or inherent to such a process, method, article, or apparatus.

In the appended drawings, the size of each element or a specific portion constituting the element may be exaggerated, omitted, or schematically illustrated for convenience and clarity of description. Accordingly, the size of each element may not necessarily reflect the actual size. If it is determined that a detailed description of a related known function or configuration may unnecessarily obscure the gist of the present disclosure, such description may be omitted.

As used herein, the term 'couple' or 'connect' includes not only a case where one member is directly coupled or directly connected to another member, but also a case where one member is indirectly coupled or indirectly connected to another member through a joint member.

The following embodiments describe a battery, a cell assembly configured to directly mount pouch-type battery cells in a pack case, and a battery pack including the same.

The present disclosure solves the problems described above, and therefore the present disclosure is directed to providing a cell assembly that is efficiently installed in a CTP (Cell To Pack) type battery pack. Additionally, the present disclosure is directed to providing a battery pack that significantly improves energy capacity by applying the cell assembly and maximizing the storage space utilization rate of the pack case. Additionally, the present disclosure is directed to providing a battery pack and a vehicle having excellent or desired energy density, assembling, cooling property and/or safety.

In one aspect of the present disclosure, a cell assembly including may be provided. The cell assembly may include: a plurality of cell banks each having one or at least two stacked pouch-type battery cells and arranged in a line with each other; a bridge bus bar unit disposed between the plurality of cell banks and electrically connecting the cell banks; and a cell cover or sleeve partially surrounding and supporting a cell unit including the plurality of cell banks and the bridge bus bar unit. The plurality of cell banks may include one or more first pouch-type battery cells forming one cell bank; and one or more other second pouch-type battery cells that form another cell bank and are arranged in a line with the first pouch-type battery cells along the longitudinal direction of the first pouch-type battery cells.

In one embodiment, the cell cover or sleeve may be configured to support the first pouch-type battery cell and the second pouch-type battery cell in a standing state. The cell cover or sleeve may be configured to partially surround the first pouch-type battery cell and the second pouch-type battery cell so that upper or lower sides of the surrounded first pouch-type battery cell and the surrounded second pouch-type battery cell are exposed. The first and second pouch-type battery cells may include an accommodation portion in which an electrode assembly is accommodated and an edge portion around the accommodation portion, and the cell cover or sleeve may be configured to cover or sleeve any one of an upper edge portion and a lower edge portion of the first and second pouch-type battery cells, and the accommodation portion.

In one embodiment, the cell cover or sleeve may include a lower cover or sleeve configured to surround a lower part of the lower edge portion of the first and second pouch-type battery cells; a first side cover or sleeve configured to extend in an upper direction from one end of the lower cover or sleeve and surround an outer side of the accommodation portion at one side of the first and second pouch-type battery cells; and a second side cover or sleeve configured to extend in an upper direction from the other end of the lower cover or sleeve at a location spaced apart from the first side cover or sleeve and surround an outer side of the accommodation portion at the other side of the first and second pouch-type battery cells.

In one embodiment, the cell cover or sleeve may include an upper cover or sleeve configured to surround an upper part of the upper edge portion of the first and second pouch-type battery cells; a first side cover or sleeve configured to extend in a lower direction from one end of the upper cover or sleeve and surround an outer side of the accommodation portion at one side of the first and second pouch-type battery cells; and a second side cover or sleeve configured to extend in a lower direction from the other end of the upper cover or sleeve at a location spaced apart from the first side cover or sleeve and surround an outer side of the accommodation portion at the other side of the first and second pouch-type battery cells.

In one embodiment, the first and second pouch-type battery cells may include a sealing portion and a non-sealing portion as the edge portion, and the cell cover or sleeve may be configured to surround at least a part of the sealing portion with respect to the first and second pouch-type battery cells and allow the non-sealing portion to be exposed.

In one embodiment, the cell cover or sleeve may be provided to have a length corresponding to a length in which the first pouch-type battery cell, the bridge bus bar unit, and the second pouch-type battery cell are sequentially arranged in a line, and may include an indentation configured in a form of being partially cut in an inward direction in at least one of an upper side and a lower side of the central region in which the bridge bus bar unit is located.

In one embodiment, the first pouch-type battery cell and the second pouch-type battery cell, a bidirectional pouch-type battery cell in which electrode leads protrude in both directions may be employed. In the first pouch-type battery cell, an electrode lead having a first polarity may be connected to the bridge bus bar unit, and in the second pouch-type battery cell, an electrode lead having a second polarity may be connected to the bridge bus bar unit.

In one embodiment, the bridge bus bar unit may include a bus bar housing made of an electrically insulating material and provided in a hollow cylindrical shape; and a bus bar partially inserted into the bus bar housing and made of a conductive material, wherein the electrode lead of the first pouch-type battery cell and the electrode lead of the second pouch-type battery cell may be in fixed contact with one surface and the other surface of the bus bar inside the bus bar housing, respectively.

In one embodiment, the bus bar housing may include at least one slot configured to insert the electrode lead of the first pouch-type battery cell or the second pouch-type battery cell into one side portion and the opposite side portion, respectively; and an insertion hole configured to insert the bus bar on the upper surface in the vertical direction. The bus bar housing may include an opening for welding on a side portion without the slot. The bus bar may include a bent upper end, and the bent upper end may be exposed to the outside of the insertion hole. The bus bar housing may be provided such that an upper surface thereof is positioned at a height lower than the upper ends of the first and second pouch-type battery cells.

In another aspect of the present disclosure, a battery pack may be provided. The battery pack may include: a cell assembly group configured by stacking a plurality of the above-described cell assemblies in a first direction; a pack case including a pack tray on which the cell assembly group is seated, and a pack cover coupled to the pack tray to cover or sleeve the cell assembly group; and a voltage sensing unit extending in the first direction, disposed on top of the cell assembly group, and electrically connected to a bus bar provided in the bridge bus bar unit of each cell assembly group. The cell assembly group may be fixedly attached to an upper surface of the pack tray.

In one embodiment, the voltage sensing unit may be made of an insulating material and disposed on top of the bridge bus bar unit, and the voltage sensing unit includes a sensing frame having sensing holes perforated for each region in which the bridge bus bar units are located; and a sensing circuit board disposed on top of the sensing frame. Each of the sensing terminals may be provided on the sensing circuit board may pass through the sensing hole to be electrically connected to the bus bar provided in the bridge bus bar unit.

In one embodiment, the cell assembly group may include a first cell assembly group and a second cell assembly group, and the battery pack may include a first cross beam extending in a second direction intersecting the first direction between the first cell assembly group and the second cell assembly group and fixedly coupled to the pack tray.

In one embodiment, the battery pack may include a second cross beam that is positioned on top of the voltage sensing unit, extending in the first direction, and fixedly coupled to the pack tray. The pack case may include a heatsink, and a thermal resin may be provided between the first and second pouch-type battery cells and the heatsink. The heatsink may include an upper heatsink and a lower heatsink disposed at an upper portion and a lower portion of the cell cover or sleeve, respectively. The cell cover or sleeve may be configured such that at least one side end thereof is fitted into the pack case. The cell assembly may include a directional venting space through which gas may move in an upward or downward direction of the cell cover or sleeve from at least one end along the longitudinal direction inside the cell cover or sleeve.

In one embodiment, the pack case may include a gas exhaust port communicating with the directional venting space. A rupture disk ruptured by a predetermined pressure or heat may be mounted in the gas exhaust port. In still another aspect of the present disclosure, there may be provided a vehicle including the battery pack described above.

According to the present disclosure, a cell assembly implemented in the form of an integrated long cell may be provided by connecting one or more pouch-type battery cells and one or more other pouch-type battery cells in the longitudinal direction using a bridge bus bar unit. By directly assembling pouch-type battery cells into the pack case of the battery pack using such a cell assembly, it is possible to maximize the space utilization rate of the battery pack and significantly improve the energy capacity. That is, according to an embodiment of the present disclosure, a module case of the battery module is omitted in configuring the battery pack. Therefore, by reducing the space occupied by the module case, more and more battery cells may be disposed inside the pack case. Thus, there is an effect that the energy density of the battery pack is further improved.

In addition, according to the present disclosure, the assembling property of the battery pack may be improved. In particular, according to an embodiment of the present disclosure, a process of preparing a battery module by accommodating pouch-type battery cells in a module case, a process of accommodating one or more battery modules prepared above in a pack case, or the like may not be performed. Accordingly, the manufacturing process may be simplified and the manufacturing time may be reduced.

In addition, according to the present disclosure, a configuration in which a plurality of pouch-type battery cells are stacked side by side in the horizontal direction while standing in the upper and lower directions in a pack case of a battery pack may be easily and stably implemented.

In addition, according the present disclosure, in the process of accommodating the soft pouch-type battery cell inside the pack case, the cell cover or sleeve may be gripped without directly gripping the pouch-type battery cell. Therefore, the process of handling the pouch-type battery cell may be performed more easily and safely. Moreover, in this case, it is possible to prevent the pouch-type battery cell from being damaged or broken during the cell handling process, such as accommodating the pouch-type battery cell inside the pack case.

In addition, according to the present disclosure, the cooling efficiency of the battery pack may be further improved. In particular, in an embodiment of the present disclosure, since a portion of each pouch-type battery cell is directly exposed to the pack case, the heat of each pouch-type battery cell may be effectively discharged to the outside through the pack case. In addition, according to an embodiment of the present disclosure, the surface cooling may be performed additionally through a large surface of the pouch-type battery cell. In addition, according to an embodiment of the present disclosure, the safety of the battery pack may be improved. In particular, according to an embodiment of the present disclosure, the gas discharged from each battery cell may be smoothly discharged to the outside. Moreover, according to an embodiment of the present disclosure, it is possible to control the discharge direction of gas or flame discharged from the battery cell. Therefore, thermal runaway propagation between adjacent battery cells may be effectively prevented.

Referring now to the appended drawings, FIG. 1 shows a perspective view schematically illustrating a configuration of a battery pack 1 according to an embodiment of the present disclosure. In one embodiment, the battery pack 1 may include a pack case 20. The pack case 20 may include a pack tray 21 and a pack cover 22. The pack tray 21 may include a first cell assembly group 10A and a second assembly group 10B therein. In one embodiment, the pack ray 21 may include a first cross beam 40 and a second cross beam 50, as shown in FIG. 1. In one embodiment, the first cross beam 40 may be accommodated between the first cell assembly group 10A and the second cell assembly group 10B to form separate spaces for facilitating accommodation of the first cell assembly group 10A and the second cell assembly group 10B in the separate spaces. In one embodiment, the second cross beam 50 may be arranged perpendicular to the first cross beam 40, as shown in FIG. 1, to form additional spaces configured for receiving additional cell assembly groups.

In one embodiment, the pack tray 21 may include a partition wall 23. The partition wall may be arranged parallel to the second cross beam 50 to form a space for accommodating a battery control system 60 (later described more in detail).

According to aspects of the present disclosure, the battery pack 1 overcomes the forgoing problems. For example, the battery pack 1 cell assembly groups 10A and 10B that may be installed or mounted without the use of components that required in a battery module. In other words, the cell assembly or assembly groups of the present disclosure may be mounted, for example, directly on the battery pack 1. That is, the cell assemblies or assembly groups may be directly or in directly mounted to the battery pack in a "cell-to-pack" manner without requiring battery module components. Additionally or alternatively, the cell assemblies or assembly groups may be directly mounted to the chassis of a vehicle in a "cell-to-chassis" manner without require battery module components.

A cell assembly group according to one or more aspect of the present disclosure may include one or more pouch-type battery cells that are accommodated inside of a cell sleeve or cover (later described more in detail). The cell sleeve does not require, among other things, a stacking frame (e.g., a plastic cartridge), a module case, or other components of a battery module. Since the cell assemblies or assembly groups of the present disclosure do not need the components required for modularization, additional cell assembly units may be provided in the space of a battery pack that is typically required for battery modules. Thus, overall energy density of a battery pack or a vehicle chassis may be increased.

Additionally or alternatively, a cell assembly according to the present disclosure may include a plurality of cell banks each having one or at least two stacked pouch-type battery cells and arranged in a line with each other, a bridge bus bar unit disposed between the plurality of cell banks and electrically connecting the cell banks, and a cell cover or sleeve partially surrounding and supporting a cell unit including the plurality of cell banks and the bridge bus bar unit.

Here, the cell bank may refer to one pouch-type battery cell or a group of pouch-type battery cells electrically connected in parallel in a state where two or more pouch-type battery cells are stacked. That is, in the present specification, the first pouch-type battery cell corresponds to one cell bank and the second pouch-type battery cell corresponds to another cell bank.

The embodiments to be described below are merely preferred embodiments of the present disclosure and do not represent all of the technical ideas of the present disclosure. That is, unlike the embodiment to be described below, the cell assembly of the present disclosure may be configured to include three or four or more cell banks. Therefore, hereinafter, it is stated in advance that the scope of the present disclosure should not be construed as being limited to the cell assembly in which the first pouch-type battery cell and the second pouch-type battery cell are connected in series as two cell banks arranged in a line, and partially surrounded by the cell cover or sleeve.

Figure 2:
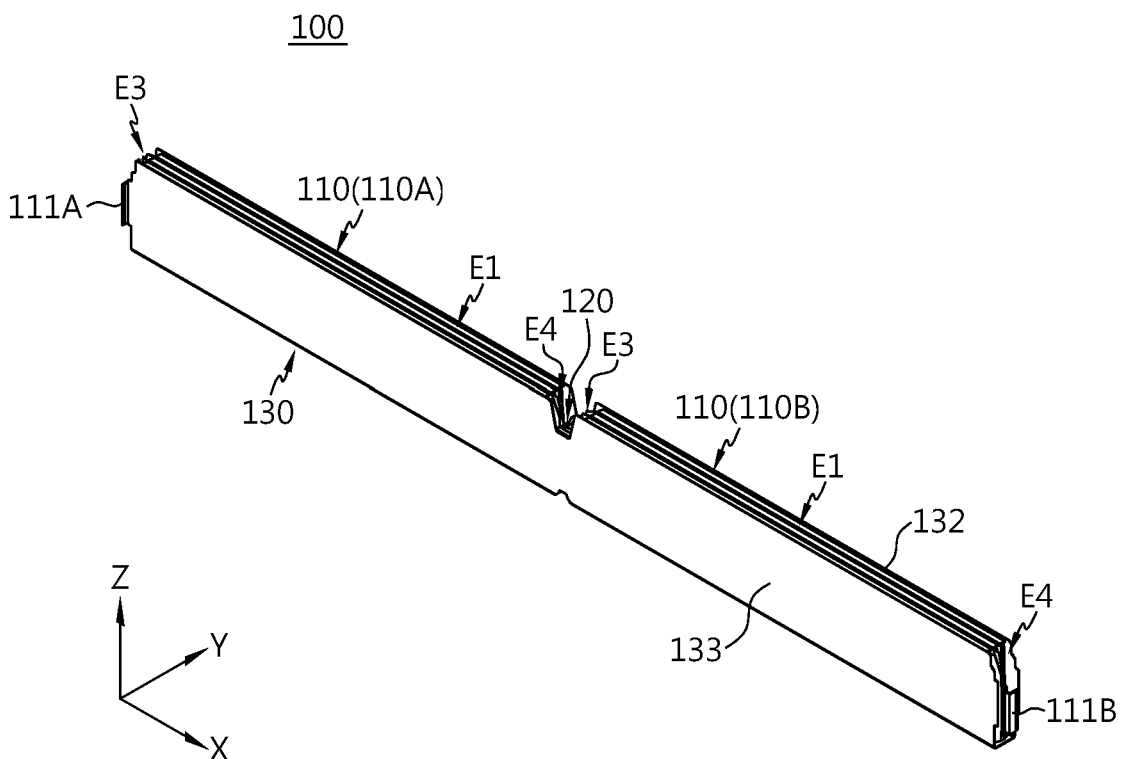
FIG. 2 is a perspective view illustrating a configuration of a cell assembly according to an embodiment of the present disclosure.
Figure 3:
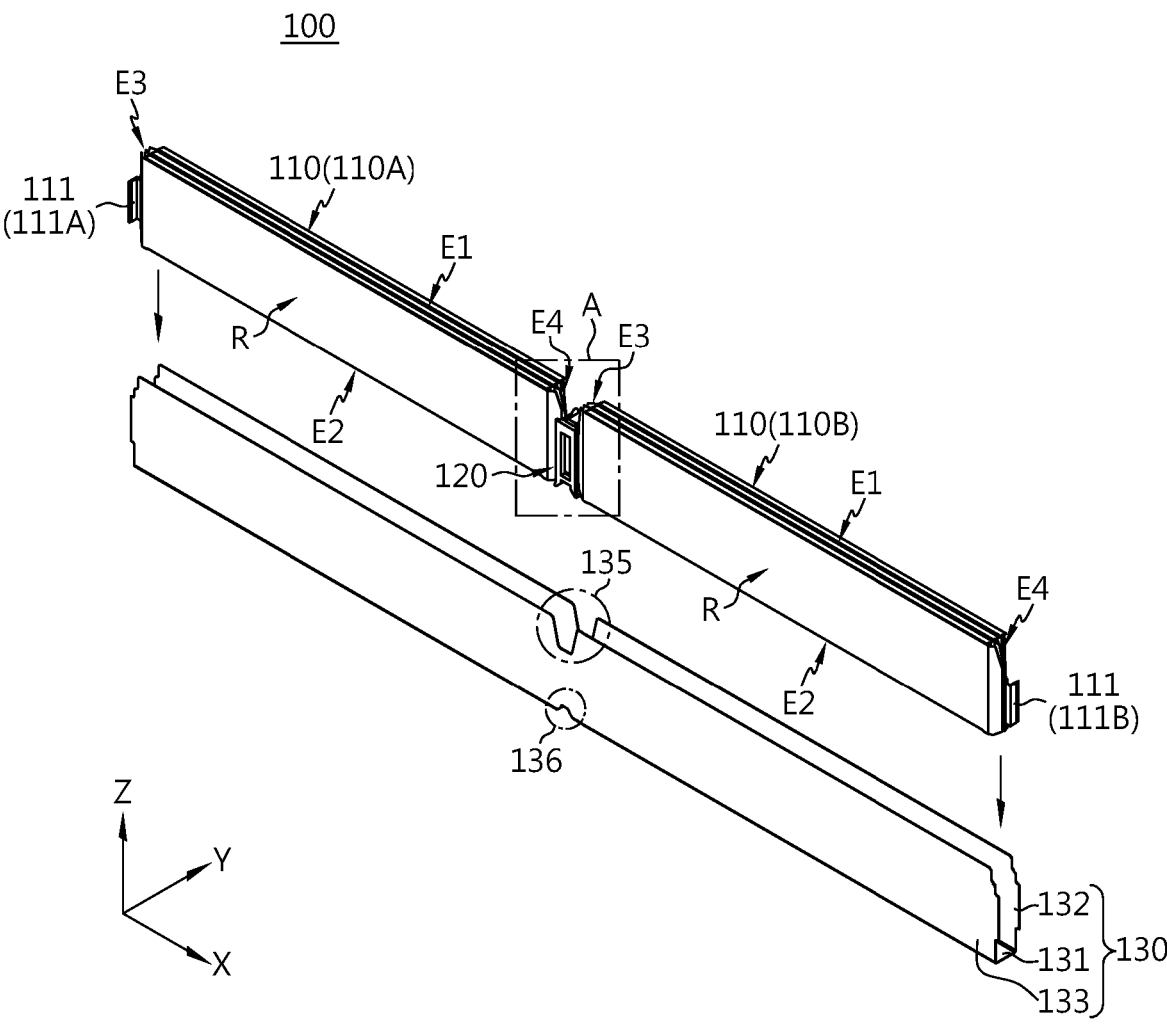
FIG. 3 is a perspective view illustrating a cell unit and a cell cover or sleeve separately according to an embodiment of the present disclosure.
Figure 4:
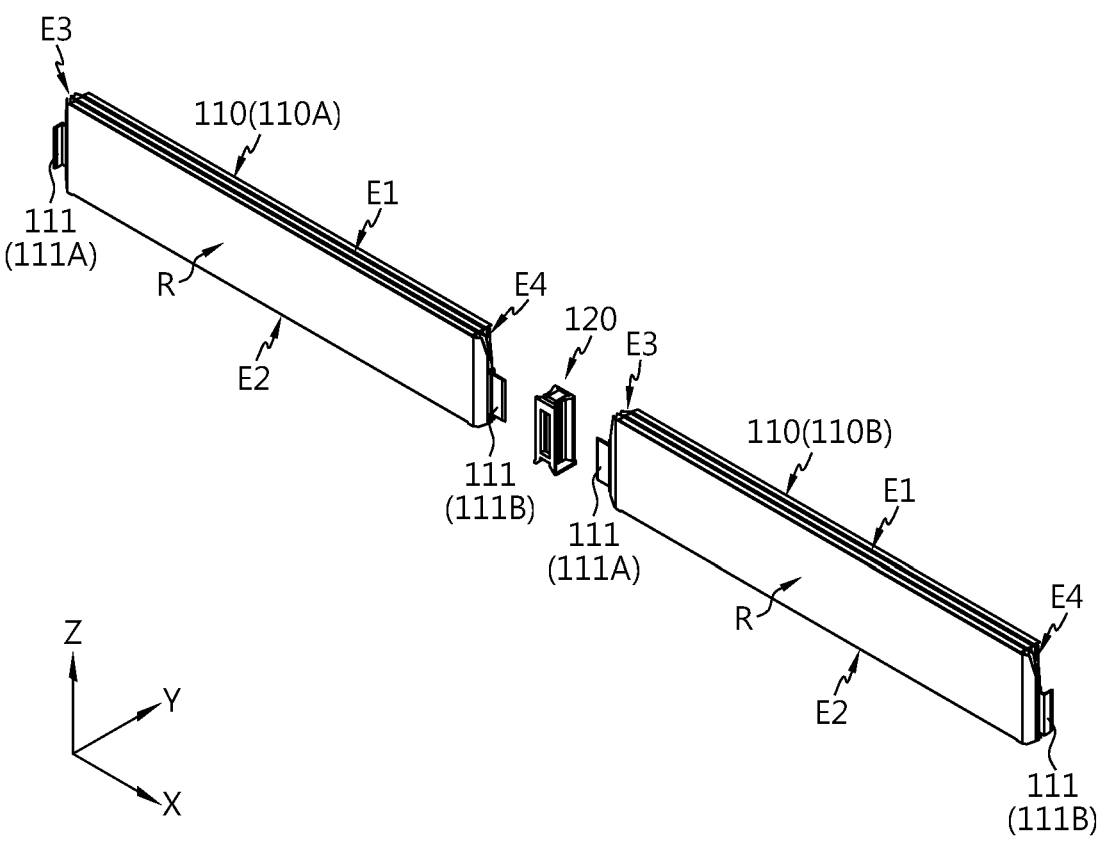
FIG. 4 is an exploded perspective view of the first and second pouch-type battery cells and a bridge bus bar unit of FIG. 3.

FIG. 2 is a perspective view illustrating a configuration of a cell assembly 100 according to an embodiment of the present disclosure, FIG. 3 is a perspective view illustrating a cell unit and a cell cover or sleeve 130 separately according to an embodiment of the present disclosure, and FIG. 4 is an exploded perspective view of the first and second pouch-type battery cells 110A, 110B and a bridge bus bar unit 120 of FIG. 3.

Referring to FIGS. 2 to 4, the cell assembly 100 according to an embodiment of the present disclosure includes one or more first pouch-type battery cells 110A; one or more other second pouch-type battery cells 110B disposed in line with the first pouch-type battery cells 110A along the longitudinal direction (X direction) of the first pouch-type battery cells; the bridge bus bar unit 120 disposed between the first pouch-type battery cells 110A and the second pouch-type battery cells 110B and electrically connecting the first pouch-type battery cells 110A and the second pouch-type battery cells 110B; and the cell cover or sleeve 130 partially surrounding and supporting the cell unit including the first pouch-type battery cells 110A, the bridge bus bar unit 120, and the second pouch-type battery cells 110B.

The pouch-type battery cell 110 includes an electrode assembly, an electrolyte, a pouch case for sealing and accommodating the electrode assembly and the electrolyte, and an electrode lead 111 connected to the electrode assembly and drawn out of the pouch case. The electrode lead 111 includes a positive electrode lead 111A and a negative electrode lead 111B as a pair. Here, the positive electrode lead 111A and the negative electrode lead 111B are provided at both ends of the battery cell in the longitudinal direction (X-axis direction) of the battery cell. The pouch-type battery cell 110 having a pair of electrode leads 111 configured as described above is referred to as a bidirectional pouch-type battery cell 110. The cell assembly 100 according to an embodiment of the present disclosure may include the bidirectional pouch-type battery cells 110.

The first pouch-type battery cell 110A may include one pouch-type battery cell 110 or two or more pouch-type battery cells 110 stacked to face each other. For example, as shown in FIGS. 2 and 3 of the present embodiment, three pouch-type battery cells 110 may be stacked in a first direction (Y-axis direction) to form a group of the first pouch-type battery cells 110A. In addition, the electrode leads 111 of the same polarity may be all positioned in the same direction so that the three pouch-type battery cells 110 are connected in parallel (3P) to form one bank. That is, as shown in FIG. 3, three first pouch-type battery cells 110A may be configured to form one bank by overlapping three positive electrode leads 111A and similarly overlapping three negative electrode leads 111B.

The second pouch-type battery cell 110B may include the same number of pouch-type battery cells as the first pouch-type battery cell 110A. That is, the second pouch-type battery cell 110B may also include one pouch-type battery cell 110 or two or more pouch-type battery cells 110 stacked to face each other. For example, like the three first pouch-type battery cells, a group of second pouch-type battery cells 110B may be configured by stacking three pouch-type battery cells 110 to form one bank.

The one group of first pouch-type battery cells 110A and the other group of second pouch-type battery cells 110B may be electrically connected to the negative electrode leads 111B of the first pouch-type battery cells 110A and the positive electrode leads 111A of the second pouch-type battery cells 110B to be connected in series with each other. From an electrical point of view, the first pouch-type battery cell 110A and the second pouch-type battery cell 110B according to the present embodiment may be configured to be connected in series and parallel in a 3P2S form, and from a structural point of view, they may be configured to be connected and integrated in the longitudinal direction in the same form as a single long cell.

Meanwhile, as another example from the above embodiment, the cell assembly 100 according to the present disclosure may connect the pouch-type battery cells 110 in the longitudinal direction in nPmS (n is a natural number and m is a natural number of two or more) form electrically, and it may be implemented in the same form as one integrated long cell. That is, for example, the cell assembly 100 may be implemented in a form in which the number of parallel connections is increased to 1P, 2P, 3P . . . , etc. according to the thickness of the pouch-type battery cell 110, or the number of series connection is increased to 2S, 3S, 4S . . . , etc. according to the length of the pouch-type battery cell 110. In this case, the cell assembly 100 may be arranged in line with the first and second pouch-type battery cells 110A, 110B, and may further include still another group of pouch-type battery cells and the bridge bus bar unit 120.

Hereinafter, for convenience of description, the electrode lead 111 will be divided into an electrode lead 111 having a first polarity and an electrode lead 111 having a second polarity. Here, the first polarity and the second polarity are relative to the polarity of the electrode lead 111. That is, if the first polarity is a positive electrode, the second polarity means a negative electrode, and conversely, if the first polarity is a negative electrode, the second polarity means a positive electrode.

The bridge bus bar unit 120 may be provided such that the electrode leads 111 of the first polarity of the first pouch-type battery cells 110A may be integrally overlapped and connected at one side, and the electrode leads 111 of the second polarity of the second pouch-type battery cells 110B may be integrally overlapped and connected at the other side.

For example, referring to FIGS. 3 to 4, in the first pouch-type battery cells 110A, the negative electrode leads 111B may be connected to the left side of the bridge bus bar unit 120 in the +X axis direction, and in the second pouch-type battery cells 110B, the positive electrode leads 111A may be connected to the right side of the bridge bus bar unit 120 in the −X axis direction. The positive electrode leads 111A and the negative electrode leads 111B may be electrically connected to each other by being welded to the surface of the bus bar 123 inside the bridge bus bar unit 120.

Figure 5:
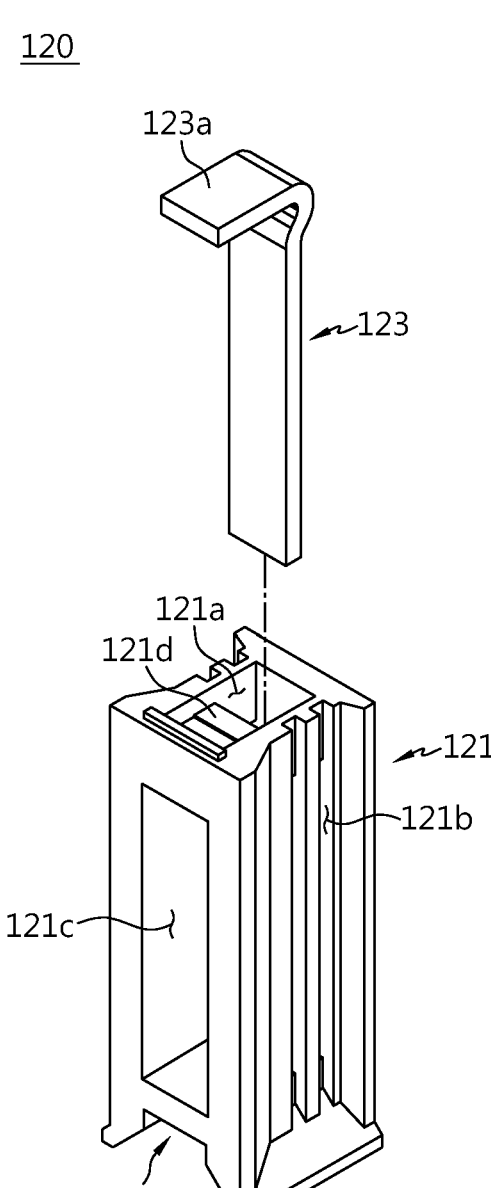
FIG. 5 is an exploded perspective view of the bridge bus bar unit of FIG. 4.

More specifically, as shown in FIG. 5, the bridge bus bar unit 120 includes a bus bar housing 121 and a bus bar 123 having a bent upper end 123a.

The bus bar housing 121 is made of an electrically insulating material and may be provided in a cylindrical shape of a hollow rectangular surface. In addition, the bus bar housing 121 may include an insertion hole 121a through which the bus bar 123 may be vertically inserted into the upper surface, at least one slot 121b in which the electrode leads 111 of the first and second pouch-type battery cells 110A, 110B may be inserted into one side portion and the opposite side portion, respectively, and an opening 121c for welding on both side portions without the slot 121b.

In addition, the bus bar housing 121 may be provided to have a height lower than the width in the width direction (Z-axis direction) of the first and second pouch-type battery cells 110A, 110B. When the bridge bus bar unit 120 and the first and second pouch-type battery cells 110A, 110B are assembled using the bus bar housing 121, the upper surface of the busbar housing 121 is positioned lower than the upper ends of the first and second pouch-type battery cells 110A, 110B, as shown in FIG. 5. As will be described later, the upper space of the bridge bus bar unit 120 ensured in this configuration may be used as an installation space for the voltage sensing unit 30 and the second cross beam 50 when the battery pack 1 is assembled.

Figure 6:
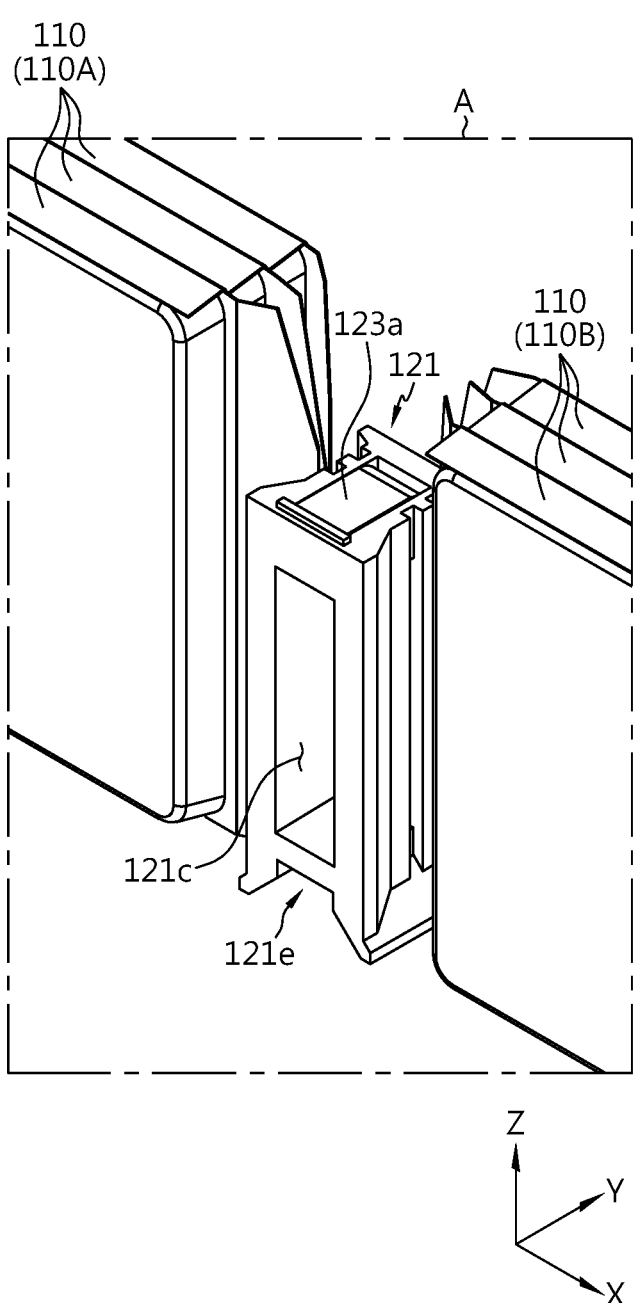
FIG. 6 is an enlarged view of region A of FIG. 3.

In addition, as shown in FIG. 6, the bus bar housing 121 includes a concave portion 121e in which the lower surface is concave toward the upper direction (Z-axis direction). The concave portion 121e may be used as a space to avoid interference with the third cross beam 24 provided in the pack tray 21 when assembling the battery pack 1 later.

The bus bar 123 is a metal material having electrical conductivity, such as copper or nickel, and is provided in a bar shape in which an upper end thereof is bent. The rest of the bus bar 123 except for the bent upper end 123a is inserted into the bus bar housing 121 through the insertion hole 121a. The insertion hole 121a is configured to have a size equal to or slightly larger than the cross-sectional area of the bus bar 123 so that the bent upper end 123a of the bus bar 123 is not inserted. According to this configuration, the bent upper end 123a of the bus bar 123 may be mounted on the support plate 121d of the bus bar housing 121 provided around the insertion hole 121a, and thus the upper surface thereof may be disposed to face upward. By exposing the bent upper end 123a of the bus bar 123 to the outside of the bus bar housing 121 in this way, the sensing terminal of the voltage sensing unit 30 may be easily in contact with the bus bar 123 when the battery pack 1 is assembled later.

Figure 7:
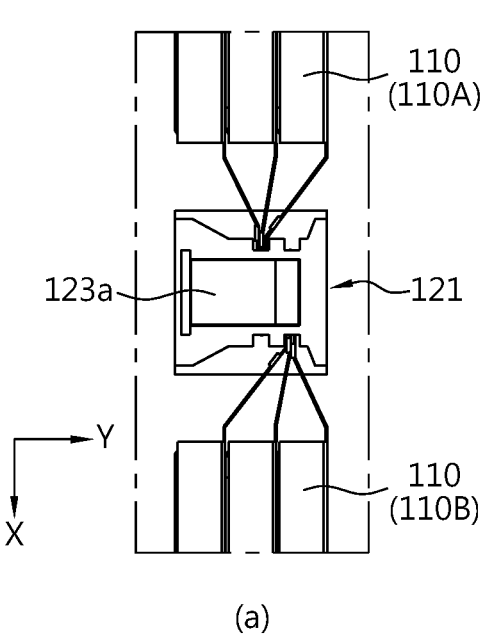
FIG. 7 is a view illustrating an upper portion (a), one side portion (b), and the other side portion (c), respectively of the bridge bus bar unit in FIG. 5.
Figure 7:
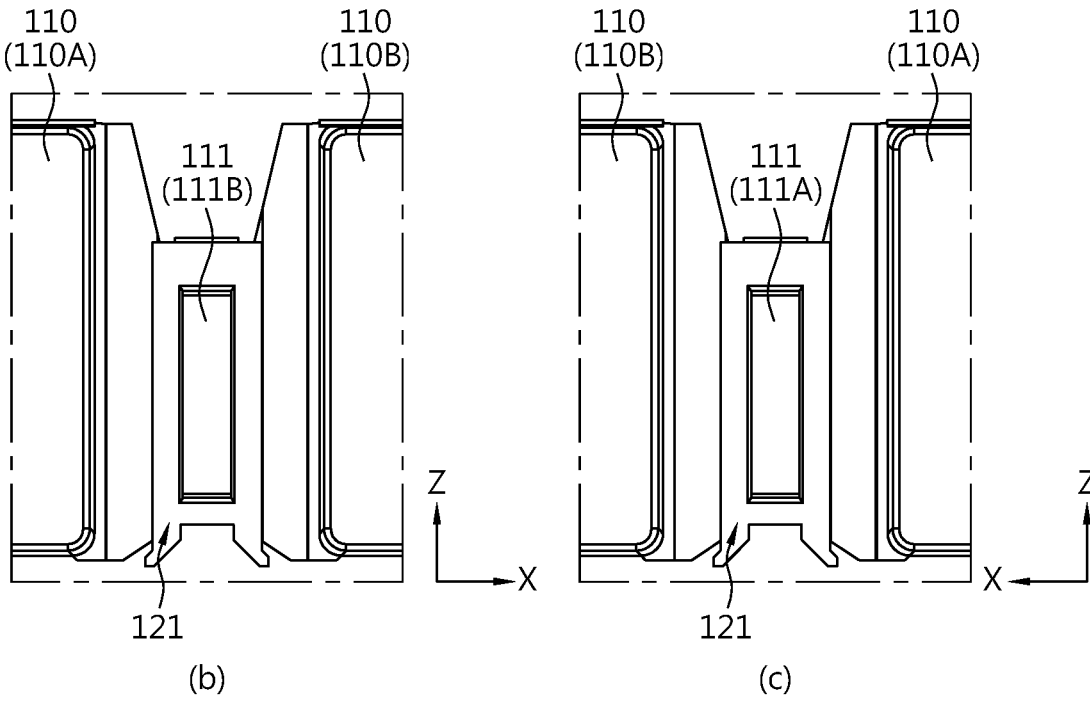

As in the embodiment shown in FIGS. 6 and 7, the first pouch-type battery cells 110A and the second pouch-type battery cells 110B may extend in opposite directions with respect to the bridge bus bar unit 120, and may be electrically connected in series.

As shown in FIG. 7 (a), the negative electrode leads 111B of the first pouch-type battery cells 110A may be inserted into the bus bar housing 121 through the slot 121b of one side of the bus bar housing 121, and the positive electrode leads 111A of the second pouch-type battery cells 110B may be inserted into the bus bar housing 121 through the slot 121*b* of the other side of the bus bar housing 121.

The negative electrode leads 111B of the first pouch-type battery cells 110A inserted into the bus bar housing 121 may be in fixed contact with one surface of the bus bar 123 by laser welding. For example, as shown in FIG. 7 (*b*), a welding laser beam may be irradiated to the negative electrode leads 111B through one opening 121*c* of the bus bar housing 121, and the negative electrode leads 111B may be welded to one surface of the bus bar 123.

In addition, the positive electrode leads 111A of the second pouch-type battery cells 110B inserted into the bus bar housing 121 may be in fixed contact with the other surface of the bus bar 123 by laser welding. Like the negative electrode leads 111B of the first pouch-type battery cells 110A, as shown in FIG. 7 (*c*), a welding laser beam may be irradiated to the positive electrode leads 111A through the other opening 121*c* of the bus bar housing 121, and the positive electrode leads 111A may be welded to other surface of the bus bar 123.

Meanwhile, the cell cover or sleeve 130 may be configured to partially cover or sleeve the first and second pouch-type battery cells 110A, 110B so that at least one side of the first and second pouch-type battery cells 110A, 110B is exposed to the outside. That is, the cell cover or sleeve 130 may not completely cover or sleeve the first and second pouch-type battery cells 110A, 110B as a whole, but may be configured to cover or sleeve only a portion thereof. The configuration of the cell cover or sleeve 130 as described above is to easily assemble the first and second pouch-type battery cells 110A, 110B to the cell cover or sleeve 130 and furthermore, is to expose at least one side of the first and second pouch-type battery cells 110A, 110B toward the pack case 20 when the cell assembly 100 is assembled to the pack case 20.

For example, referring to the embodiment of FIGS. 2 and 3, the cell cover or sleeve 130 may be configured to surround the cell unit including the first pouch-type battery cell 110A, the bridge bus bar unit 120, and the second pouch-type battery cell 110B, which are sequentially disposed in a line, but the top of the surrounded cell unit may not be covered.

In this case, when the battery pack is assembled as shown in FIG. 1, the cell assembly 100 is mounted on the pack tray 21 so that the upper edge portions E1 of the first and second pouch-type battery cells 110A, 110B face the pack cover 22, a thermal resin is applied to the upper edge portions E1, and the pack cover is covered, thereby directly transferring heat emitted from each pouch-type battery cell 110 to the pack cover 22 through the thermal resin. According to this configuration, since a separate cooling structure does not need to be provided between the pouch-type battery cell 110 and the pack case 20, the cooling configuration may be simple and efficient.

Referring to FIGS. 2 to 4 again, the pouch-type battery cell 110 may include an accommodation portion denoted by R and an edge portion denoted by E1 to E4. Here, the accommodation portion R may be a portion where an electrode assembly configured in a form in which a positive electrode plate and a negative electrode plate are stacked on each other with a separator interposed therebetween is accommodated. In addition, the electrolyte may be accommodated in the accommodation portion R. Also, the edge portions E1 to E4 may be disposed in a form surrounding the accommodation portion R.

In particular, the edge portion may be a sealing portion where the pouch case, which is the case of the pouch-type battery cell 110, is sealed. For example, in FIG. 4, it may be said that four edge portions are provided and positioned at an upper edge, a lower edge, a front edge, and a rear edge, respectively, with respect to the accommodation portion R. In this case, all the four edge portions E1 to E4 may be sealing portions. Alternatively, some of the four edge portions E1 to E4 may be configured in a folded form instead of a sealing portion. For example, in the embodiment of FIG. 4, the lower edge portion E2 may be a folded portion of the pouch case, and all of the upper edge portion E1, the front edge portion E3, and the rear edge portion E4 may be sealing portions. Here, a battery cell in which all four edge portions E1 to E4 are sealed may be referred to as a four-sided sealing cell, and a battery cell in which three edge portions E1, E3, and E4 are sealed may be referred to as a three-sided sealing cell.

In this configuration, the cell cover or sleeve 130 may be configured to surround both sides of the accommodation portion R of the first and second pouch-type battery cells 110A, 110B and a part of the edge portions E1 to E4. For example, when one cell cover or sleeve 130 is configured to surround a plurality of stacked pouch-type battery cells 110, it may be configured to surround the outer surface of the accommodation portion of the outermost pouch-type battery cell 110 and the upper or lower edge portion of the entire pouch-type battery cell 110.

As a more specific example, as shown in FIGS. 2 to 3, it may be configured in a form in which one cell cover or sleeve 130 surrounds three first and second pouch-type battery cells 110A, 110B stacked in the left and right direction (±Y direction). In this case, the cell cover or sleeve 130 may be configured to surround the outer surface of the accommodation portion R of the left outermost battery cell in the first and second pouch-type battery cells 110A, 110B, the lower edge portions E2 of the first and second pouch-type battery cells 110A, 110B, and the outer surface of the accommodation portion R of the right outermost battery cell in the first and second pouch-type battery cells 110A, 110B.

Meanwhile, as another example from this embodiment, the cell cover or sleeve 130 may be configured to surround the upper edge portions E1 rather than the lower edge portions E2 of the first and second pouch-type battery cells 110A, 110B. As still another example, when one cell cover or sleeve 130 is configured to surround the first and second pouch-type battery cells 110A, 110B, each of which is formed of one pouch-type battery cell 110, the cell cover or sleeve 130 may be configured to surround both surfaces of the accommodation portion R (e.g. the left surface and the right surface of the same accommodation portion R) of the one pouch-type battery cell 110 and the upper edge portion E1 or the lower edge portion E2.

According to such an embodiment, it is possible to easily implement a configuration in which one or more pouch-type battery cells 110 are supported and protected by one cell cover or sleeve 130. In addition, according to the embodiment, the process of handling one or more pouch-type battery cells 110 may be easily and safely performed through the cell cover or sleeve 130. Also, according to the embodiment, one cell cover or sleeve 130 may face the surfaces of the two accommodation portions R with respect to the pouch-type battery cell 110 accommodated therein. Therefore, the cooling performance between the accommodation portion R and the cell cover or sleeve 130 may be further improved. In particular, in this case, surface cooling may be implemented through the wide surface of the accommodation portion R, and thus cooling efficiency may be improved.

In addition, the cell cover or sleeve 130 may be configured such that the edge portions located at both ends in the longitudinal direction (±X direction) of the first and second pouch-type battery cells 110A, 110B accommodated therein are not surrounded. That is, the cell cover or sleeve 130 may be configured to surround one of the upper edge portion E1 and the lower edge portion E2 of the first and second pouch-type battery cells, except for the front edge portion E3 of the first pouch-type battery cell 110A in which the electrode lead of the first polarity is positioned and the rear edge portion E4 of the second pouch-type battery cell 110B in which the electrode lead of the second polarity is positioned.

According to this embodiment of the present disclosure, it is possible to induce the discharge direction of flames or the like to the exposed side of the cell cover or sleeve 130. For example, according to the embodiment, since the front side and the rear side of the cell cover or sleeve 130 in which the electrode lead 111 is located are open, flames or the like may be discharged in this open direction. In particular, when the cell cover or sleeve 130 is configured in a shape in which the front and rear sides are open as described above, side directional venting may be easily implemented.

The cell cover or sleeve 130 may be configured to partially surround a cell unit including the first pouch-type battery cell 100A, the bridge bus bar unit 120, and the second pouch-type battery cell 100B arranged in a line.

Referring to FIGS. 2 and 3, and FIGS. 8 and 9, the cell cover or sleeve 130 may be configured in an approximately U-shape capable of tightly pressing both outermost surfaces of the first and second pouch-type battery cells 110A, 110B and exposing the upper edge portions E1 of the first and second pouch-type battery cells 110A, 110B in order to support the first and second pouch-type battery cells 110A, 110B in a lined up state. When external impact or vibration occurs, the cell cover or sleeve 130 may serve to prevent the first pouch-type battery cell 110A and the second pouch-type battery cell 110B from being distorted in a clockwise or counterclockwise direction with the bridge bus bar unit 120 as an axis.

In addition, since the cell cover or sleeve 130 is provided with a thin plate having excellent mechanical rigidity and a thin thickness, space loss may be minimized when assembling the battery pack 1 later. For example, when the cell cover or sleeve 130 is made of a metal material having excellent rigidity such as steel, in particular, a SUS material, the standing state of the cell unit may be more stably maintained. Therefore, when assembling the cell unit to the battery pack 1 later, the standing state of the cell unit may be more reliably supported.

More specifically, as shown in FIGS. 2 and 3, the cell cover or sleeve may include a lower cover or sleeve 131, a first side cover or sleeve 132, and a second side cover or sleeve 133.

Here, the lower cover or sleeve 131 may be configured to surround the lower part of the lower edge portion E2 of the first and second pouch-type battery cells 110A, 110B accommodated therein. In particular, the lower cover or sleeve 131 may be configured to be in contact with or spaced apart from the lower edge portion E2 of the first and second pouch-type battery cells 110A, 110B. Also, the lower cover or sleeve 131 may be configured in a planar shape.

The first side cover or sleeve 132 may be configured to extend in the upper direction from one end (+Y direction) of the lower cover or sleeve 131. For example, the first side cover or sleeve 132 may be configured to be elongated in the upper direction (+Z direction in the drawing) from the left end of the lower cover or sleeve 131. Also, the first side cover or sleeve 132 may be formed in a planar shape.

In addition, the first side cover or sleeve 132 may be configured to surround the outer side of the accommodation portion at one side of the first and second pouch-type battery cells 110A, 110B accommodated therein. Here, the first side cover or sleeve 132 may be disposed in direct contact with the outer surface of the accommodation portion R or may be adhered with an adhesive.

The second side cover or sleeve 133 may be positioned to be spaced apart from the first side cover or sleeve 132 in a horizontal direction, and may be configured to extend in the upper direction from the other end (−Y direction) of the lower cover or sleeve 131. For example, the second side cover or sleeve 133 may be configured to be elongated in the upper direction (+Z direction in the drawing) from the right end of the lower cover or sleeve 131. Moreover, the second side cover or sleeve 133 may also be configured in a planar shape like the first side cover or sleeve 132. At this time, the second side cover or sleeve 133 and the first side cover or sleeve 132 may be configured to be parallel to each other.

In addition, the second side cover or sleeve 133 may be configured to surround the outer side of the accommodation portion at the other side of the first and second pouch-type battery cells 110A, 110B accommodated therein. Here, the second side cover or sleeve 133 may be disposed in direct contact with the outer surface of the accommodation portion or may be adhered with an adhesive.

The cross-sectional areas of the first side cover or sleeve 132 and the second side cover or sleeve 133 are larger than the cross-sectional areas of the first and second pouch-type battery cells 110A, 110B arranged in a line facing the first side cover or sleeve 132 and the second side cover or sleeve 133, thereby preventing the accommodation portion R from being exposed to the outside and thus ensuring safety as much as possible.

In addition, the cell cover or sleeve 130 may be provided to have a length corresponding to a length in which the first pouch-type battery cell 110A, the bridge bus bar unit 120, and the second pouch-type battery cell 110B are sequentially arranged in a line. For example, as shown in FIG. 3, the first pouch-type battery cells 110A and the second pouch-type battery cells 110B may be configured to extend from one end to the other end. For reference, unlike this embodiment, when a group of pouch-type battery cells 110 are further extended in the longitudinal direction to 3S, 4S . . . etc. to form the cell assembly 100, the cell cover or sleeve 130 may be configured to have a length capable of accommodating all the pouch-type battery cells 110 extended in the longitudinal direction.

In particular, the cell cover or sleeve 130 according to this embodiment may include indentations 135, 136 configured to be partially cut inward in at least one of an upper end and a lower end of a position where the bridge bus bar unit 120 is accommodated.

In the cell cover or sleeve 130 according to the present embodiment, as indicated by a circle in FIG. 3, indentations may be configured in two places at the upper end and the lower end of the cell cover or sleeve 130. Hereinafter, the indentation provided at the upper end of the cell cover or sleeve 130 is referred to as the upper indentation 135, and the indentation provided at the lower end of the cell cover or sleeve 130 is referred to as the lower indentation 136.

As shown in FIG. 2, the cell assembly 100 according to the present embodiment may be provided in a form where the central region in which the bridge bus bar unit 120 is located is recessed inward.

Figure 8:
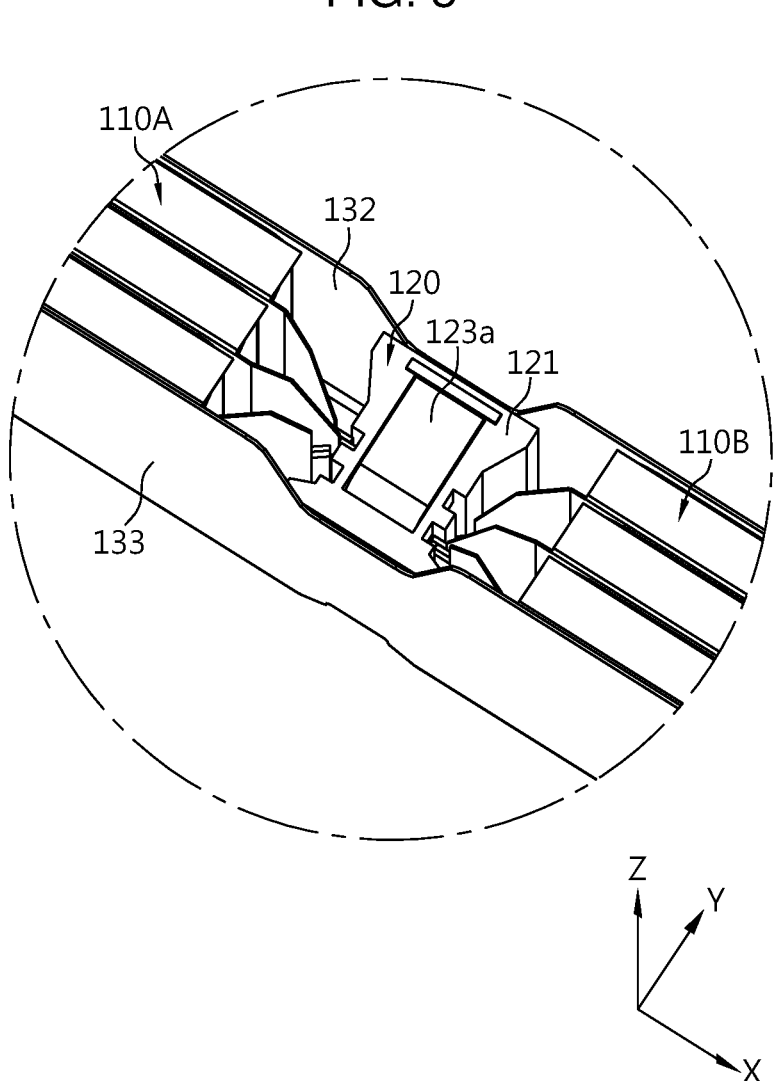
FIG. 8 is a view of a central region of a cell assembly according to an embodiment of the present disclosure as viewed from the top.
Figure 9:
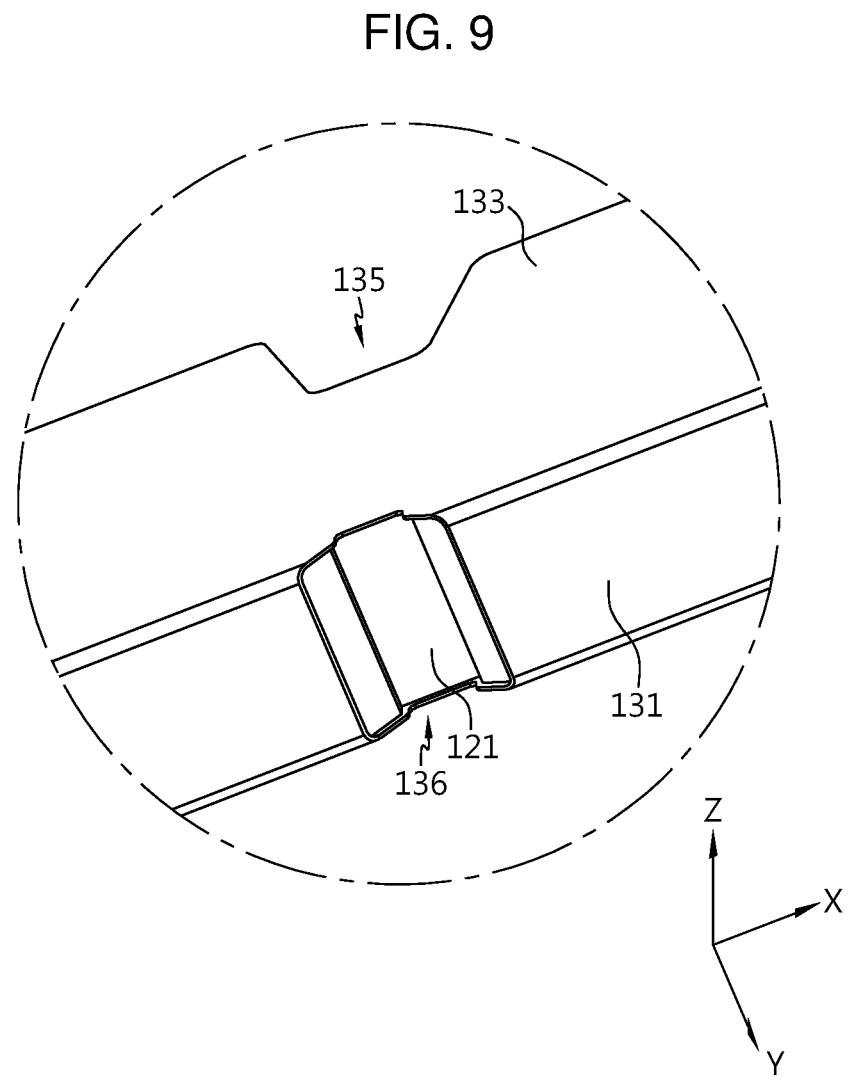

For example, in the bridge bus bar unit 120, an upper surface portion of the bus bar housing 121 is lower than the upper edge portion E1 of the first and second pouch-type battery cells 110A, 110B as shown in FIG. 6. Thus, when the bridge bus bar unit 120 is accommodated in the cell cover or sleeve 130, the upper surface portion thereof may be configured not to protrude above the upper indentation 135 as shown in FIG. 8, and the lower surface portion thereof may be configured not to protrude below the lower indentation 136 as shown in FIG. 9.

Figure 13:
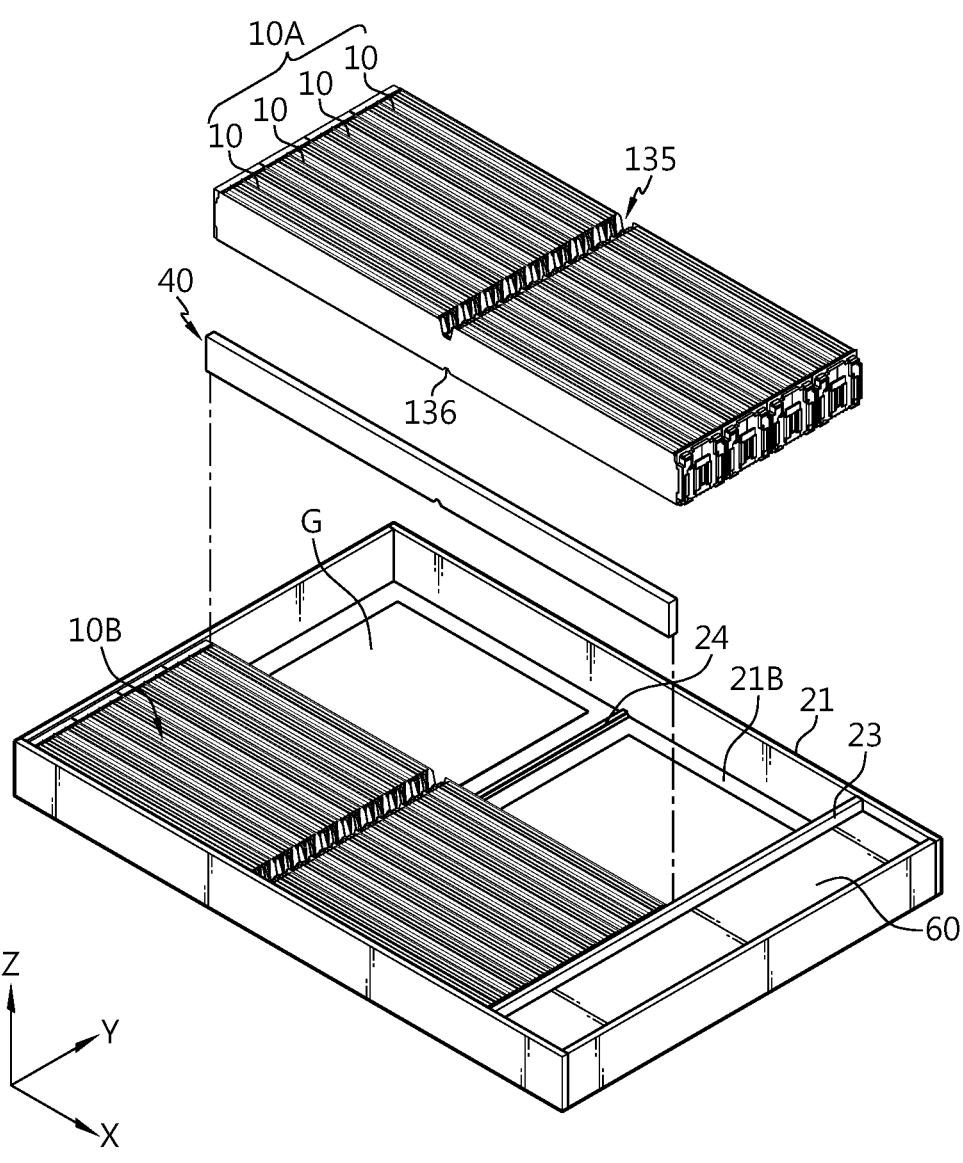
FIG. 13 is a perspective view illustrating a configuration of a plurality of cell assembly groups, a first cross beam, and a pack tray in a battery pack according to an embodiment of the present disclosure.
Figure 14:
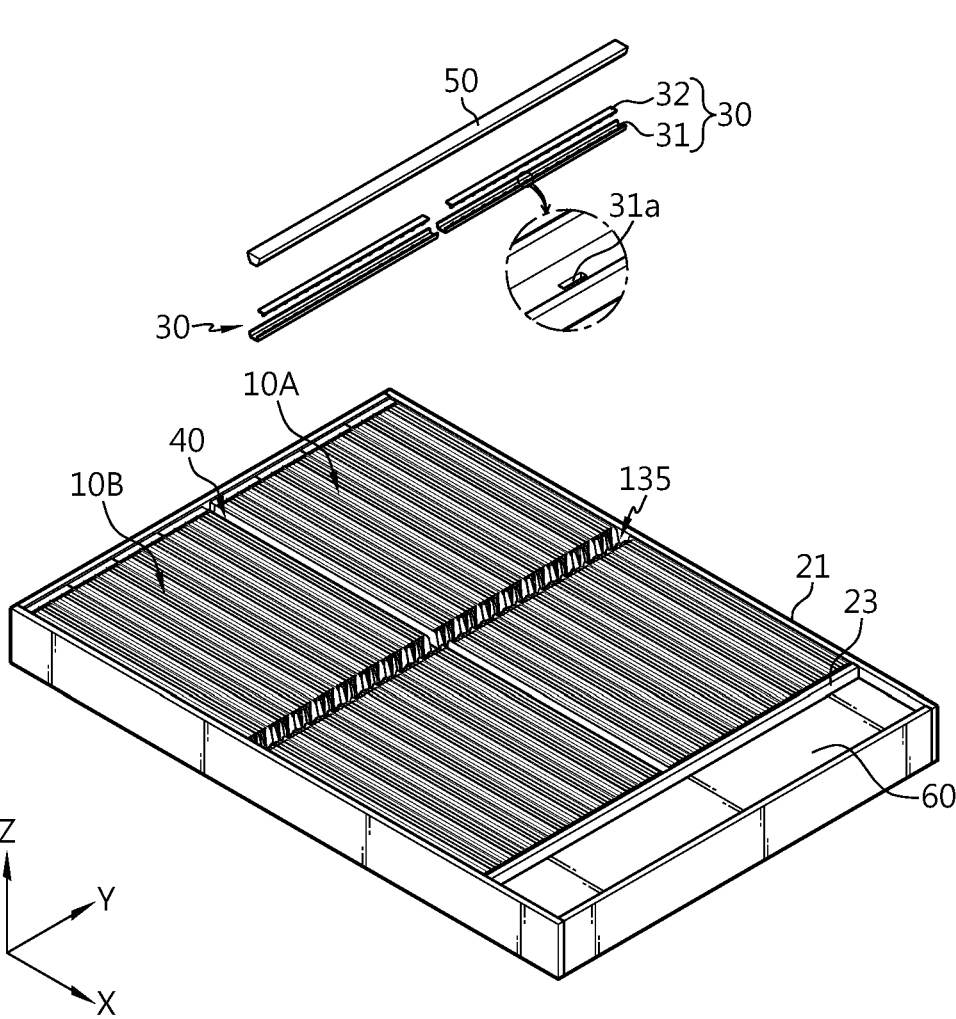
FIG. 14 is a perspective view illustrating a voltage sensing unit and a second cross beam separately in FIG. 1.

When a plurality of cell assemblies 100 configured as described above are stacked as shown in FIG. 10 to form a cell assembly group 10, the cell assembly group 10 has a valley-shaped structure in which the upper indentation 135 and the lower indentation 136 of each cell assembly 100 are connected in one direction (±Y direction). As shown in FIGS. 1, 13, and 14, the valley-shaped structure may be used as an installation space for the voltage sensing unit 30, the second cross beam 50, and the third cross beam 24 when assembling the battery pack 1.

Figure 10:
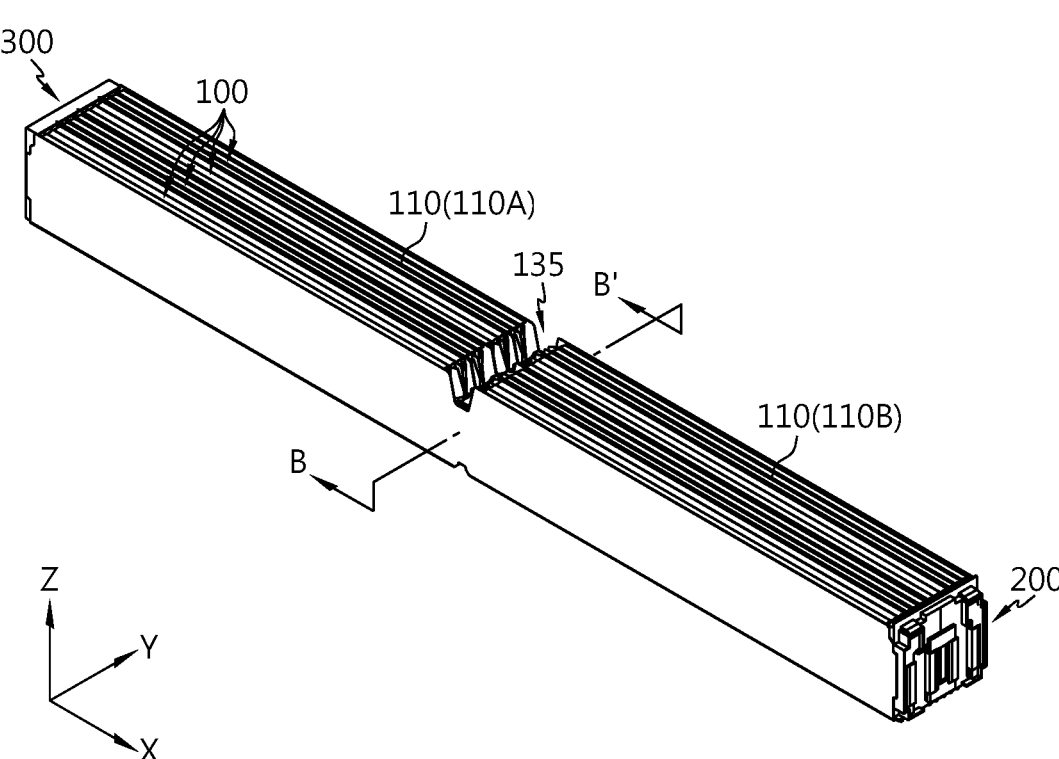
FIG. 10 is a perspective view illustrating one cell assembly group configured by stacking four cell assemblies according to an embodiment of the present disclosure.
Figure 11:
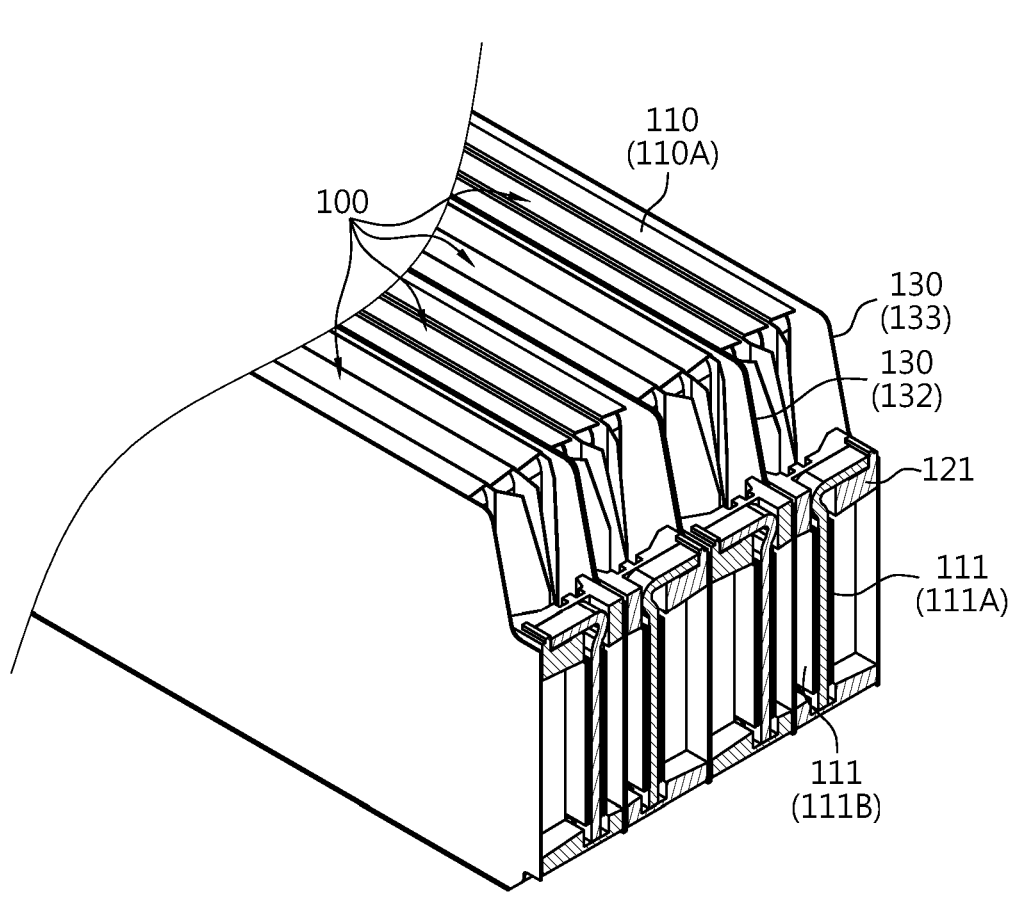
FIG. 11 is a cutaway view of the cell assembly group taken along line B-B' of FIG. 10.

Meanwhile, when a plurality of cell assemblies 100 having the above-described configuration are stacked in the first direction, the cell assembly group 10 may be prepared as shown in FIG. 10. Specifically, the cell assembly group 10 illustrated in FIG. 10 is configured by stacking four cell assemblies 100 in the first direction (Y direction). At this time, as shown in FIG. 11, the electrode leads 111 having the first polarity of the first pouch-type battery cells 110A of each cell assembly 100 are overlapped and fixedly in contact with one surface of the bus bar 123 of each bridge bus bar unit 120, and the electrode leads 111 having the second polarity of the second pouch-type battery cells 110B are overlapped and fixedly in contact with the other surface of the bus bar 123 of each bridge bus bar unit 120, to be connected in series.

In addition, a front bus bar unit 200 and a rear bus bar unit 300 may be used to electrically connect the four cell assemblies 100. As shown in FIG. 10, the front bus bar unit 200 includes a front outer bus bar housing made of an insulating material, which is configured to integrally cover or sleeve the front portions of the four cell assemblies 100 in the +X axis direction, and a plurality of plate-shaped bus bars mounted on the front outer bus bar housing, and the rear bus bar unit 300 includes a rear bus bar housing made of an insulating material, which is configured to integrally cover or sleeve the rear portions of the four cell assemblies 100 in the −X axis direction, and a plurality of plate-shaped bus bars mounted on the rear bus bar housing.

Each of the front bus bar housing and the rear bus bar housing may include slots in the Z-axis direction, wherein electrode leads 111 may be inserted into the slots to be taken out to the outside of the bus bar housing and the extracted portion may be welded to the plate-shaped bus bars. The four cell assemblies 100 may also be electrically connected to each other by the front bus bar unit 200 and the rear bus bar unit 300.

Figure 12:
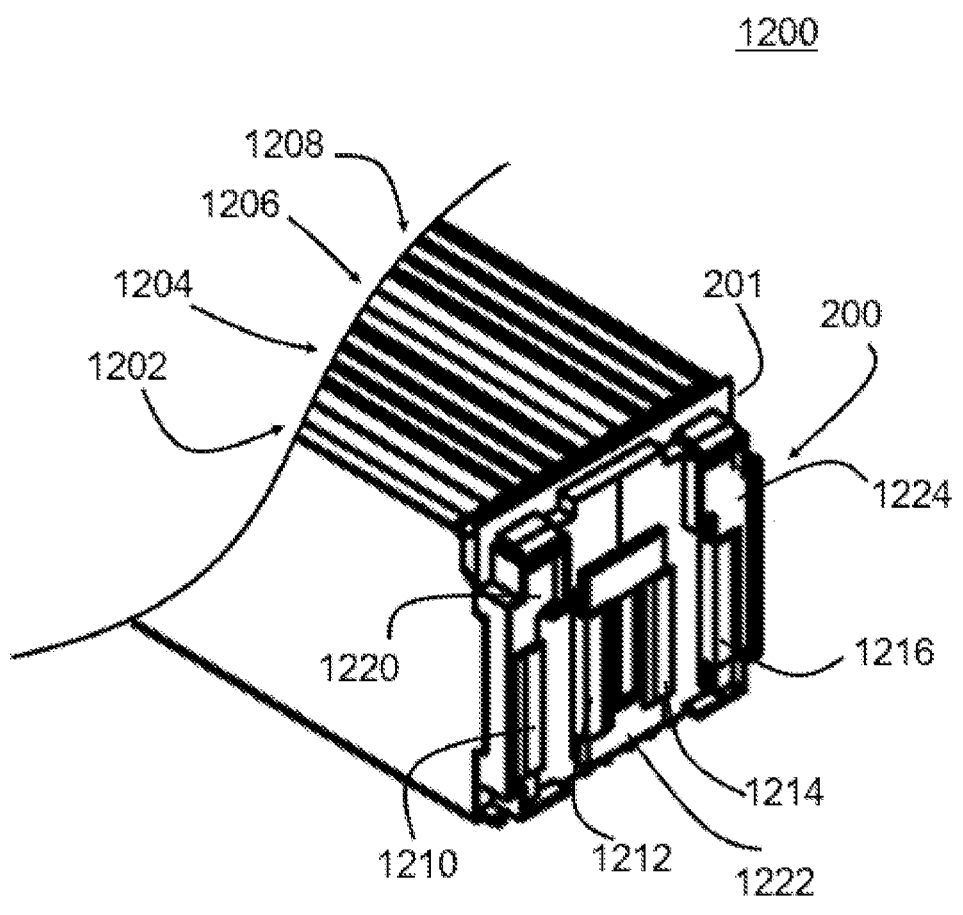
FIG. 12 is a perspective view schematically illustrating a configuration of a cell assembly group a front bus bar unit according to an embodiment of the present disclosure.

FIG. 12 is a perspective view schematically illustrating a configuration 1200 of a cell assembly group 10 including a front bus bar unit 200 according to an embodiment of the present disclosure. In one embodiment, the cell assembly group 10 may include a first cell assembly 1202, a second cell assembly 1204, a third cell assembly 1206, and a fourth cell assembly 1208. Each of the first, second, third, and fourth cell assemblies 1202-1208 may include a plurality of pouch-type battery cells. Each of the plurality of pouch-type battery cells may include one or more electrode leads (or tabs). In one embodiment, the first cell assembly 1202 may include first electrode leads (or tabs) 1210 on a first side of the first cell assembly 1202. The first electrode leads 1210 may comprises at least one electrode lead of each of the plurality of battery cells in the first cell assembly 1202. The first cell assembly 1202 may include a plurality of electrode leads (not shown in the figure for clarity of illustration and explanation) that are on a second side of the first cell assembly 1202 opposite the first side. The second, third, and fourth cell assemblies 1204, 1206, and 1208 may include second electrode leads 1212, third electrode leads 1214, and fourth electrode leads 1216, respectively, similarly to the first cell assembly 1202. The second, third, and fourth electrode leads 1212-1216 may be arranged on the first side of the second, third, and fourth cell assemblies 1204-1208, in the similar manner as described in accordance with the first cell assembly 1202.

In this embodiment, the cell assembly group 10 may include a front bus bar unit 200. The front bus bar unit 200 may include an outer bus bar housing 201 and a plurality of slits (not shown in the figure for clarity of illustration and description) on the outer bus bar housing 201. The front bus bar unit 200 may further include a first busbar 1220, a second busbar 1222, and a third busbar 1224. The first, second, and third busbars 1220-1224 may have plate or bar shapes. However, the shape of the busbars 1220-1224 are not limited thereto.

In one embodiment, the first electrode leads 1210 may be inserted through at least one of the slits on the outer busbar housing 201. The first electrode leads 1210 inserted through the at least one of the slits on the outer busbar housing 201 may be coupled to the first busbar 1220, as shown in FIG. 12. In one embodiment, the first electrode leads 1210 may be welded to the first busbar 1220. Alternatively or additionally, the first electrode leads 1210 may be folded in a first direction to be coupled to the first busbar 1220. The second and third electrode leads 1212, 1214 may be inserted through the respective slits to be coupled to the second busbar 1222, as shown in FIG. 12. In one embodiment, the second and third electrode leads 1212, 1214 may be welded to the second busbar 1222. Alternatively or additionally, the second and third electrode leads 1210 may be folded in a one or more directions to be coupled to the second busbar 1222. In one embodiment, the fourth electrode lead 1216 may be coupled to the third bus bar 1224 in the similar manner as the first electrode leads 1210. The first, second, third, and fourth electrode leads 1210-1216 may be electrically connected to in series or in parallel via the first, second, and third busbars 1220-1224.

Figure 15:
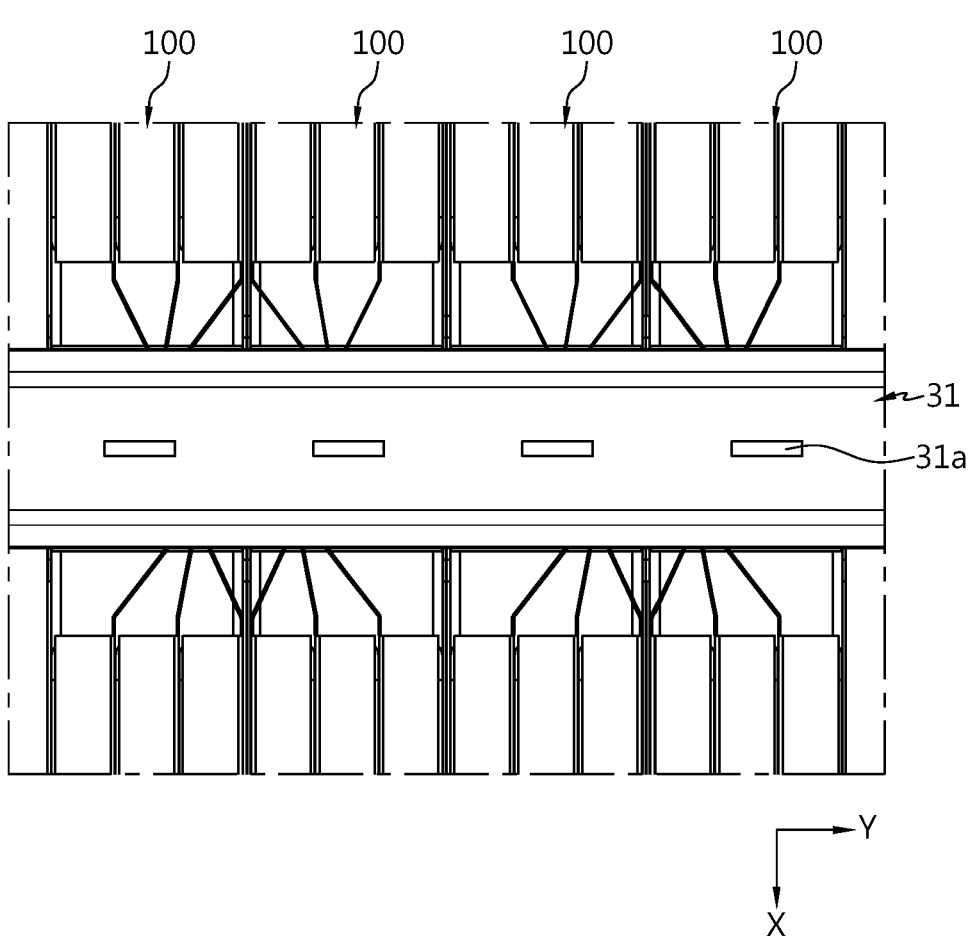
FIGS. 15 and 16 are views for describing an assembly structure of a bridge bus bar unit and a voltage sensing unit in a battery pack according to an embodiment of the present disclosure.
Figure 16:
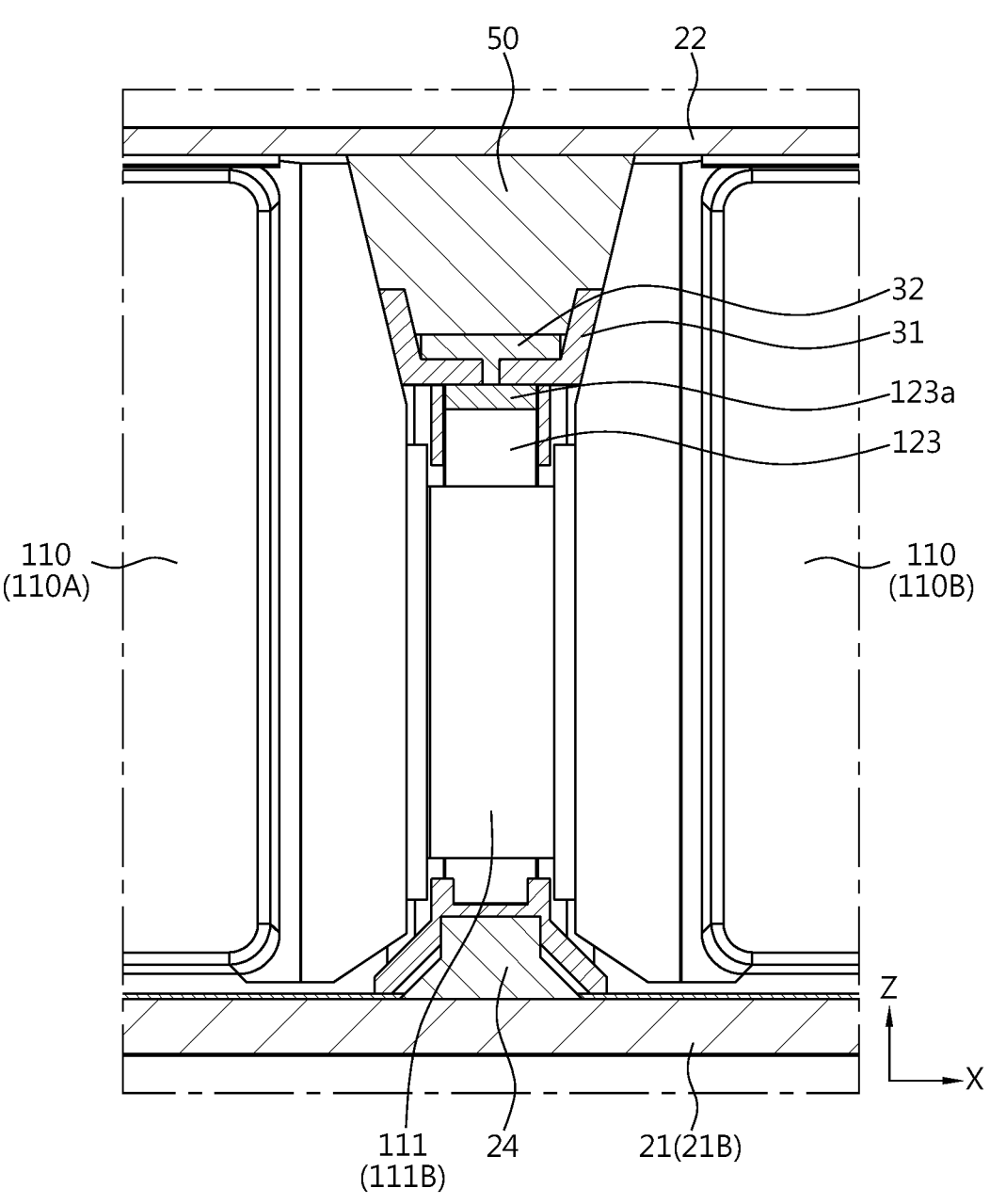

FIG. 13 is a perspective view illustrating a configuration of a plurality of cell assembly groups, a first cross beam, and a pack tray in a battery pack according to an embodiment of the present disclosure, FIG. 14 is a perspective view illustrating a voltage sensing unit and a second cross beam separately in FIG. 1, and FIGS. 15 and 16 are views for describing an assembly structure of a bridge bus bar unit and a voltage sensing unit in a battery pack according to an embodiment of the present disclosure.

Hereinafter, a battery pack 1 according to the present disclosure configured by applying the above-described cell assembly 100 will be described in detail with reference to the drawings.

A battery pack 1 according to an embodiment of the present disclosure includes a plurality of cell assembly groups 10 stacked in a first direction (Y direction), respectively, a pack case 20 for accommodating the plurality of cell assembly groups 10, a voltage sensing unit 30, cross beams 23, 40, 50, and a battery control system 60.

The plurality of cell assembly groups 10 may be referred to as an assemblage of the above-described cell assemblies 100, and may be accommodated in the pack case 20 as shown in FIG. 1.

The plurality of cell assembly groups 10 may be divided into a first cell assembly group 10A and a second cell assembly group 10B. It can be seen that the division of the plurality of cell assembly groups 10 into the first cell assembly group 10A and the second cell assembly group 10B is for convenience of distinguishing between those located in the +Y axis direction and those located in the −Y axis direction based on the first cross beam 40 of the pack tray 21 in FIGS. 12 to 13.

The pack case 20 may include a pack tray 21 and a pack cover 22.

The pack tray 21 may include a bottom plate 21B having a substantially wide rectangular plate shape and four side plates forming a wall along the peripheral edge of the bottom plate 21B. In addition, a first cross beam 40, a second cross beam 50, a third cross beam 24, and a partition wall 23 may be integrally provided or additionally assembled to the pack tray 21. The first cross beam 40, the second cross beam 50, the third cross beam 24, and the partition wall 23 may serve to prevent deformation such as distortion of the pack tray 21 by supporting the bottom plate 21B and the side plates of the pack tray 21 during external impact or vibration. That is, the pack tray 21 may have higher mechanical rigidity by adding the first cross beam 40, the second cross beam 50, the third cross beam 24, the partition wall 23, and the like as described above.

As shown in FIG. 13, the cell assemblies 100 may be filled in a space surrounded by the bottom plate 21B, the partition wall 23, the side plate in the −X axis direction, and the side plate in the ±Y axis direction inside the pack tray 21. Here, as described above, the cell assembly 100 may be configured in the form of a long cell, in which the cell cover or sleeve 130 partially surrounds the first pouch-type battery cell 110A, the bridge bus bar unit 120, and the second pouch-type battery cell 110B arranged in a line. The cell assembly group 10 is formed by stacking the cell assemblies 100, and a plurality of cell assembly groups 10 are disposed in close contact with the pack tray 21, thereby minimizing a dead space in the pack tray 21.

The cell assembly groups 10 may be configured to be adhered and fixed to the bottom plate 21B of the pack tray 21. To this end, an adhesive G or an adhesive sheet may be provided on the bottom plate 21B of the pack tray 21. Here, the adhesive may mean a thermal resin. Preferably, the adhesive G or the adhesive sheet may have excellent thermal conductivity. In this case, the heat of the pouch-type battery cells 110 may be more effectively radiated to the outside. Although not shown, it may be configured to absorb heat radiated from the pouch-type battery cells 110 by disposing a heatsink between the adhesive and the bottom plate 21B of the pack tray 21 or by attaching a heatsink under the bottom plate 21B of the pack tray 21.

The pack cover 22 may be provided in a form of shielding the plurality of cell assembly groups 10 and other components, and may be configured to be coupled to the pack tray 21. For example, the pack cover 22 and the pack tray 21 may be configured to be coupled to each other in a manner such as bolting, bonding, snap-fitting, welding, or the like.

Meanwhile, since the cell assembly 100 is configured in a form in which the first pouch-type battery cells 110A and the second pouch-type battery cells 110B are connected in series, a voltage sensing is required at a place where the first pouch-type battery cells 110A and the second pouch-type battery cells 110B are connected in series. Accordingly, the battery pack of the present disclosure includes a voltage sensing unit 30 connected to the bus bar 123 of the bridge bus bar unit 120 of each cell assembly 100 for voltage sensing where the first pouch-type battery cells 110A and the second pouch-type battery cells 110B are connected in series.

Specifically, referring to FIGS. 14 to 16, the voltage sensing unit 30 is configured to extend in the first direction, to be inserted into a valley formed by connecting the upper indentation 135 of the above-described cell assembly group at the top of the first cell assembly group 10A and the second cell assembly group 10B, and to be electrically connected to the bus bars 123 provided in the bridge bus bar units 120 of each cell assembly groups 10.

The voltage sensing unit 30 may be configured to include a sensing frame 31 and a sensing circuit board 32 as shown in FIG. 14. The sensing frame 31 is made of an insulating material and may be inserted into the upper indentation 135 of the cell assemblies 100 of FIG. 11. In addition, as shown in FIGS. 15 to 16, the sensing frame 31 includes sensing holes 31a perforated in each region where the bridge bus bar unit 120 of each cell assembly 100 is located. The bent upper end 123a of the bus bar 123 is positioned below the sensing holes 31a.

The sensing circuit board 32 may be implemented as a rigid circuit board or a flat flexible printed circuit board that may be disposed on the sensing frame 31, and may include sensing terminals that may be inserted into the sensing holes 31a.

According to the above configuration, as shown in FIG. 16, the sensing terminal may pass through the sensing hole 31a to contact the bus bar 123 of the bridge bus bar unit 120, that is, the bent upper end 123a of the bus bar 123, and then may be electrically connected thereto.

The voltage sensing unit 30 may be connected to the battery control system 60 by a signal transmission member (not shown) such as a cable connector or a flexible printed circuit board (FPCB), and may be configured to transmit and receive data to and from the BMS through the signal transmission member.

The cross beams include a first cross beam 40, a second cross beam 50, and a third cross beam 24. As described above, the cross beams are components provided for the mechanical rigidity of the pack tray 21.

Like the embodiment of FIG. 13, the first cross beam 40 may be provided in the pack tray 21 in the form of extending in the second direction (X-axis direction) intersecting the first direction (Y-axis direction) between the first cell assembly group 10A and the second cell assembly group 10B. In the drawings, the first cross beam 40 is separated from the bottom plate 21B of the pack tray 21, but may be provided integrally with the pack tray 21 of the first cross beam 40.

In addition, the first cross beam 40 may have a height similar to that of the bus bar housing 121 of the bridge bus bar unit 120, and may be provided in a shape in which a central lower end is recessed upwardly along the longitudinal direction (X-axis direction).

The second cross beam 50 may be configured to be located on the voltage sensing unit 30, to extend in the first direction, and to be fixedly coupled to both side plates in the ±Y axis direction of the pack tray 21. Also, as shown in FIG.

1, the second cross beam 50 may be configured to be inserted into the upper indentation 135 of the cell assemblies 100.

The third cross beam 24 is configured to extend in the second direction from the bottom plate 21B of the pack tray 21, and to have both ends fixedly coupled to both side plates in the ±Y axis direction, as shown in FIG. 13. In the installation structure of the cross beams, the size of the second cross beam 50 is relatively smaller than that of the first cross beam 40, so that the supporting force of the second cross beam 50 with respect to the pack tray 21 may be relatively weak. The third cross beam 24 may serve to reinforce the second cross beam 50 having a relatively weak supporting force with respect to the pack tray 21. As described above, the cell assemblies 100 include a lower indentation 136. Therefore, even if the third cross beam 24 is on the bottom plate 21B of the pack tray 21, the cell assembly groups 10 may be easily seated on the bottom plate 21B of the pack tray 21 without interfering with the third cross beam 24.

Meanwhile, the battery control system 60 included in the battery pack according to an embodiment of the present disclosure may be provided in a space separated from the cell assembly groups 10 by the partition wall 23. The battery control system 60 may include a battery management system (BMS) and a battery disconnect unit (BDU). The BMS may be configured to control the charging/discharging states, the power states, the performance states, or the like of the pouch-type battery cells 110. The BDU controls electrical connection of battery cells in order to manage power capacity and functions of the battery pack 1. To this end, the BDU may include a power relay, a current sensor, a fuse, and the like.

As described above, the battery pack 1 according to the present disclosure may fill the inside the pack case 20 with a great number of pouch-type battery cells 110 having a large capacity by maximally utilizing the internal space of the pack case 20.

For example, in the case of the conventional battery pack 1 of FIG. 1, module case configurations for configuring a battery module, gaps between each battery module and a cross beam, and a complex layout of cables for electrically connecting battery modules arranged in a lattice structure, and the like act as negative factors in increasing the energy capacity of the battery pack 1. However, the battery pack 1 of the present disclosure has no negative elements as described above.

Therefore, according to the configuration of the present disclosure, the pouch-type battery cells 110 may fill the inside of the pack case 20 in a remarkably space-efficient manner, thereby providing the battery pack 1 with improved energy capacity.

Figure 17:
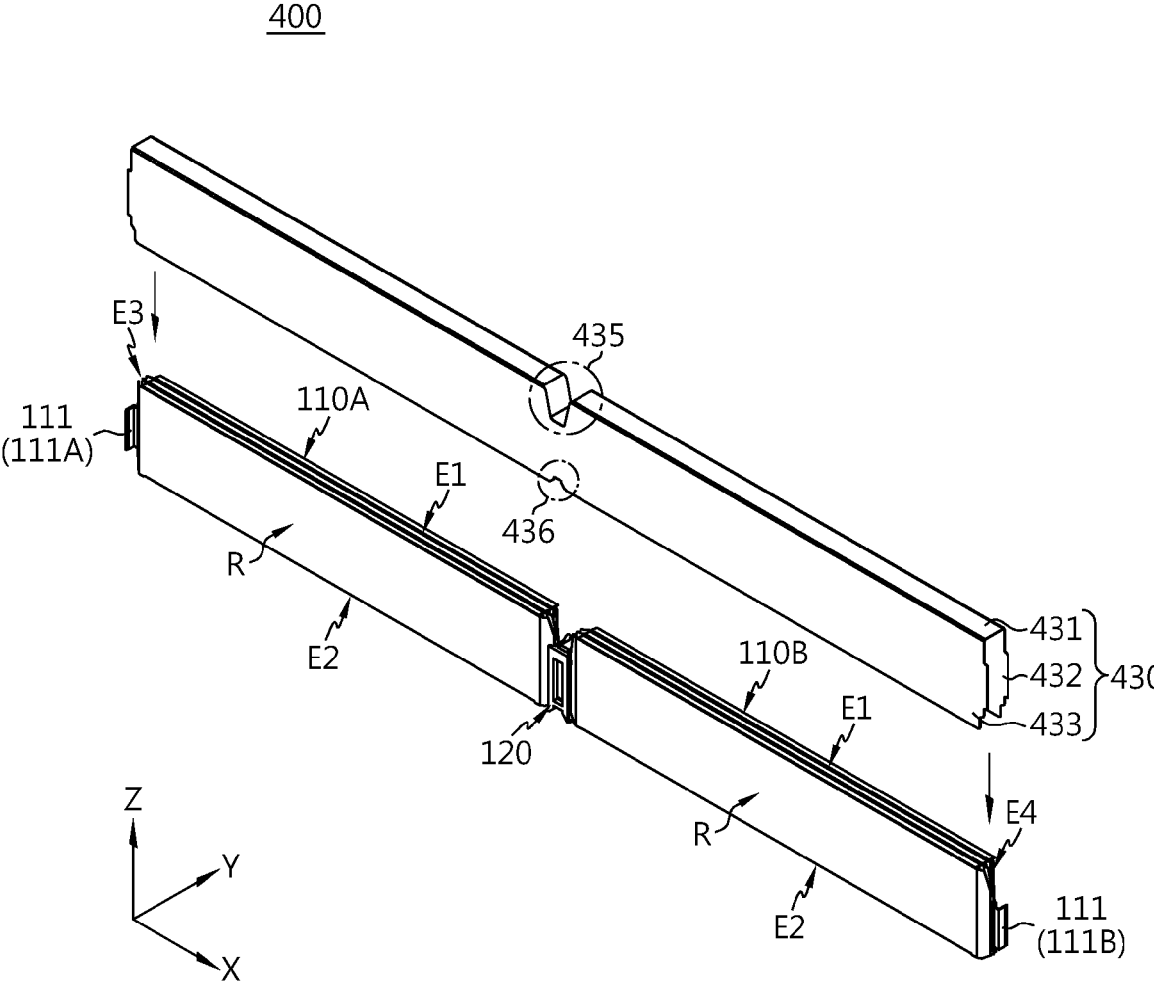
FIG. 17 is an exploded perspective view illustrating a main configuration of a cell assembly according to another embodiment of the present disclosure.
Figure 18:
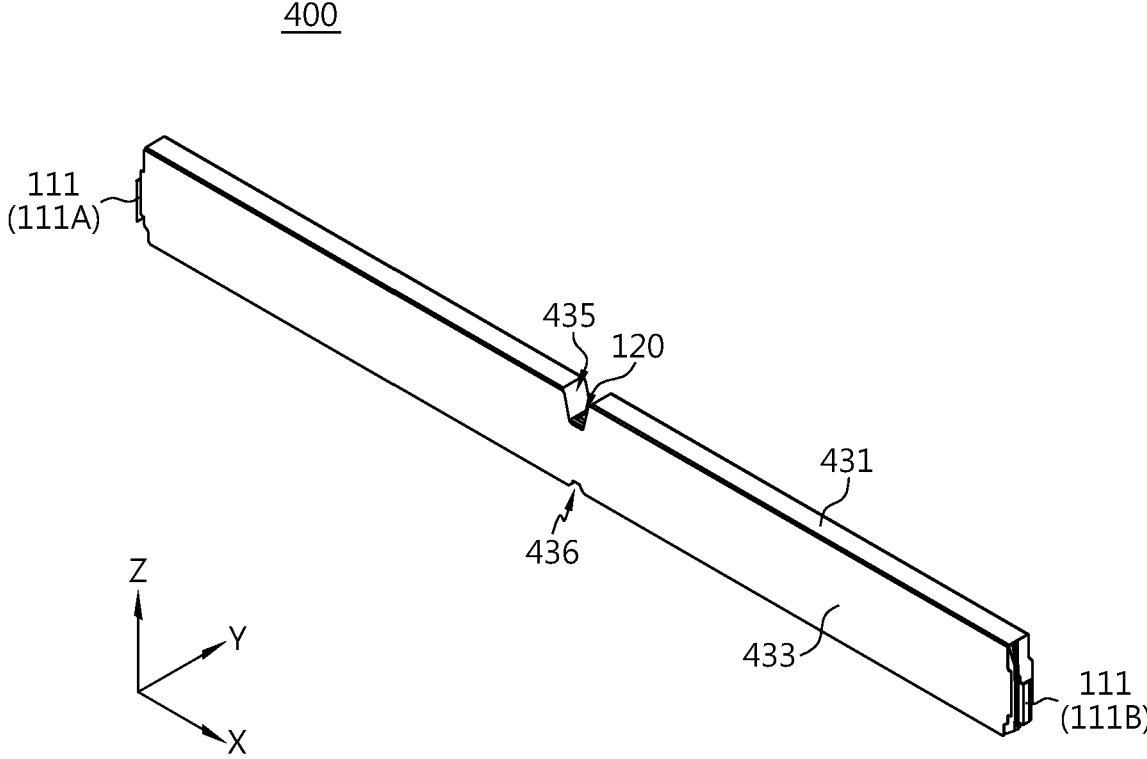
FIG. 18 is a perspective view of a cell assembly according to another embodiment of the present disclosure.
Figure 19:
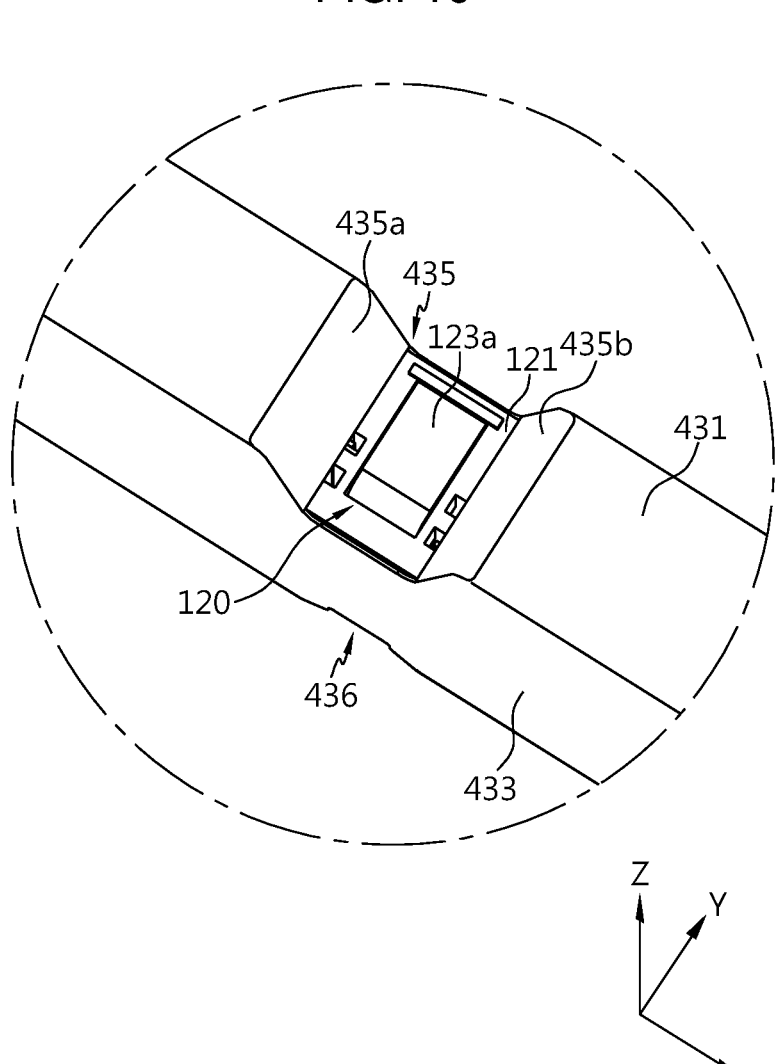
FIG. 19 is a view of the central region of the cell assembly of FIG. 18 as viewed from the top.
Figure 20:
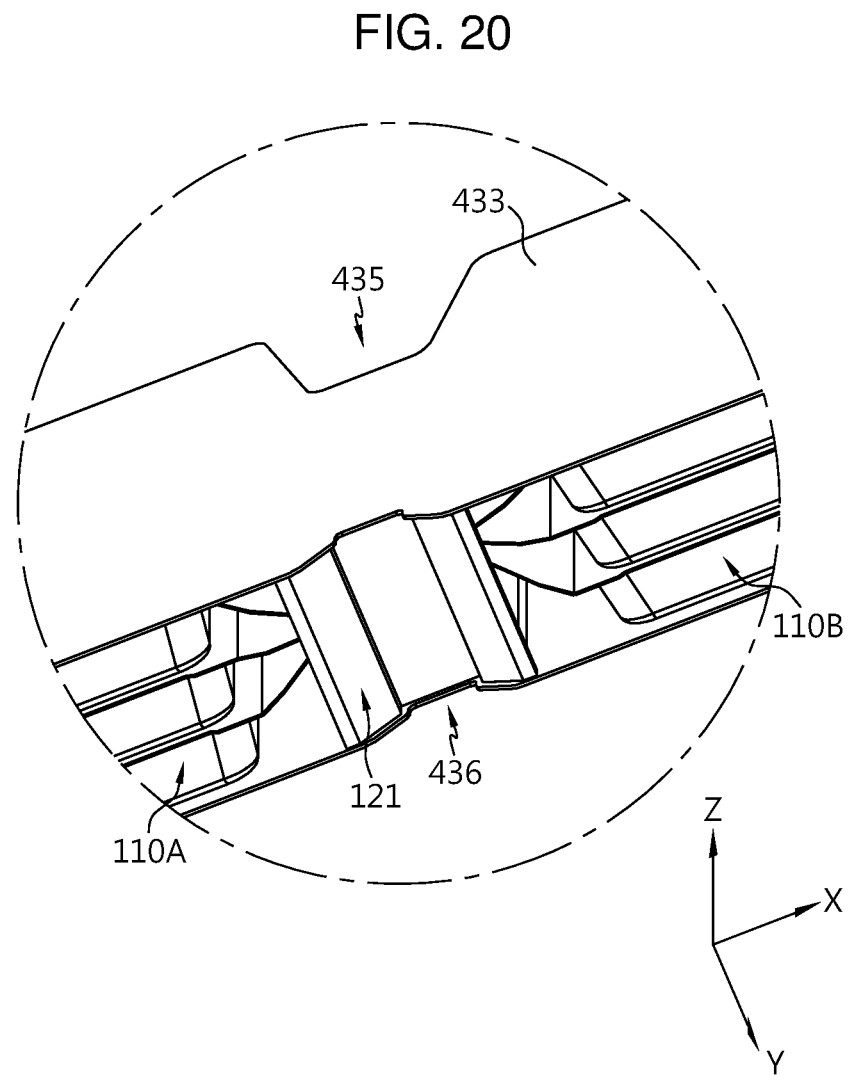

FIG. 17 is an exploded perspective view illustrating a main configuration of a cell assembly according to another embodiment of the present disclosure, FIG. 18 is a perspective view of a cell assembly according to another embodiment of the present disclosure, FIG. 19 is a view of the central region of the cell assembly of FIG. 18 as viewed from the top, and FIG. 20 is a view of the central region of the cell assembly of FIG. 18 as viewed from the bottom.

Next, a cell assembly 400 according to another embodiment of the present disclosure will be described with reference to FIGS. 17 to 20. The same reference numerals as in the above-described embodiment represent the same members, duplicate descriptions of the same members will be omitted, and differences from the above-described embodiment will be mainly described.

When compared with the above-described cell assembly 100, the cell assembly 400 according to another embodiment of the present disclosure differs in the configuration of the cell cover or sleeve and the assembly structure of the cell cover or sleeve and the cell unit, and other configurations are substantially the same.

The cell assembly 400 according to another embodiment of the present disclosure includes a cell cover or sleeve 430 partially surrounding a cell unit including a first pouch-type battery cell 110A, a bridge bus bar unit 120, and a second pouch-type battery cell 110B arranged in a line. In particular, the cell cover or sleeve 430 may be configured to surround the upper and both sides of the cell unit, but not the lower side, so that the lower edge portions E2 of the first and second pouch-type battery cells are exposed to the outside.

That is, if the cell cover or sleeve 130 of the above-described embodiment has an approximately U-shaped longitudinal cross-section in order to expose the upper edge portions E1 of the first and second pouch-type battery cells 110A, 110B, the cell cover or sleeve 430 according to another embodiment of the present disclosure may have an approximately n-shaped longitudinal cross-section in order to expose the lower edge portions E2 of the first and second pouch-type battery cells.

More specifically, as shown in FIGS. 17 to 18, the cell cover or sleeve 430 may include a upper cover or sleeve 431, a first side cover or sleeve 432, and a second side cover or sleeve 433.

Here, the upper cover or sleeve 431 may be configured to surround the upper part of the upper edge portion E1 of the pouch-type battery cell 110 accommodated therein. In particular, the upper cover or sleeve 431 may be configured to be in contact with or spaced apart from the upper edge portion E1 of the pouch-type battery cell 110. Also, the upper cover or sleeve 431 may be configured in a planar shape. In this case, the upper cover or sleeve 431 may have a cross-section formed in a linear shape in a horizontal direction, and thus may surround the upper edge E1 of the pouch-type battery cell 110 in a linear shape from the outside.

The first side cover or sleeve 432 may be configured to extend in the lower direction from one end of the upper cover or sleeve 431. For example, the first side cover or sleeve 432 may be configured to be elongated in the lower direction (−Z axis direction in the drawing) from the left end of the upper cover or sleeve 431. Moreover, the first side cover or sleeve 432 may configured in a planar shape. At this time, the first side cover or sleeve 432 may be configured in a bent form in the upper cover or sleeve part 431.

In addition, the first side cover or sleeve 432 may be configured to surround the outer side of the accommodation portion R at one side of the first and second pouch-type battery cells 110A, 110B accommodated therein.

The second side cover or sleeve 433 may be positioned to be spaced apart from the first side cover or sleeve 432 in a horizontal direction. Also, the second side cover or sleeve 433 may be configured to extend in the lower direction from the other end of the upper cover or sleeve 431. For example, the second side cover or sleeve 433 may be configured to be elongated in the lower direction from the right end of the upper cover or sleeve 431. Moreover, the second side cover or sleeve 433 may also be configured in a planar shape like the first side cover or sleeve 432. At this time, the second side cover or sleeve 433 and the first side cover or sleeve 432 may be disposed parallel to each other while being spaced apart in a horizontal direction.

In addition, the second side cover or sleeve 433 may be configured to surround the outer side of the accommodation portion R at the other side of the pouch-type battery cell 110 accommodated therein. In the above embodiment, the cell cover or sleeve 430 may have an internal space limited by the upper cover or sleeve 431, the first side cover or sleeve 432, and the second side cover or sleeve 433. Also, the cell cover or sleeve 430 may accommodate one or more pouch-type battery cells 110 in the limited internal space as described above.

In addition, the cross-sectional areas of the first side cover or sleeve 432 and the second side cover or sleeve 433 are larger than the cross-sectional area of the pouch-type battery cell 110 facing the first side cover or sleeve 432 and the second side cover or sleeve 433, thereby preventing the accommodation portion R from being exposed to the outside and thus ensuring safety as much as possible.

In particular, the pouch-type battery cell 110 may include a sealing portion and a non-sealing portion as the edge portions E1 to E4. For example, in the embodiment of FIG. 17, the upper edge portion E1 may be a DSF (Double Side Folding) portion serving as a sealing portion of the pouch-type battery cell 110, and the lower edge portion E2 may be a non-sealing portion of the pouch-type battery cell 110.

The cell cover or sleeve 430 may be configured to surround the pouch-type battery cell 110 such that, among the edge portions E1 to E4, at least a part of the sealing portion is surrounded and at least a part of the non-sealing portion is not surrounded but exposed to the outside. For example, referring to the embodiment of FIG. 17, the cell cover or sleeve 430 may be configured to cover or sleeve the upper edge portion E1 that is a part of the sealing portion of the pouch-type battery cell 110. In this case, it may be regarded that the pouch-type battery cell 110 accommodated in the cell cover or sleeve 430 is configured such that the upper edge portion E1 serving as the sealing portion faces the upper cover or sleeve 431. In addition, the cell cover or sleeve 430 may surround the pouch-type battery cell 110 so that the lower edge portion E2 serving as the non-sealing portion of the pouch-type battery cell 110 is exposed to the outside. In this case, it may be regarded that the lower edge portion E2 serving as the non-sealing portion of the pouch-type battery cell 110 is disposed at the open surface of the cell cover or sleeve 430.

For reference, in the pouch-type battery cell 110, the upper edge portion E1 serving as a sealing portion may be more vulnerable to the discharge of relatively high-temperature gas or flame than the lower edge portion E2 serving as a non-sealing portion. However, according to this embodiment, when the upper edge portion E1 serving as a sealing portion is disposed to face the upper cover or sleeve part 431 and the venting gas is emitted from the sealing portion, it may be more advantageous for directional venting that prevents the upward movement of the venting gas and induces horizontal and/or downward movement.

In addition, in the pouch-type battery cell 110, the lower edge portion E2 serving as a non-sealing portion may have a flat shape with a relatively wider cross-sectional area than the upper edge portion E1 serving as a sealing portion. Thus, the lower edge portion E2 may be disposed at the open surface of the cell cover or sleeve 430 and be in direct contact with a thermal resin G1 to be explained later, thereby improving the cooling efficiency.

In addition, the cell cover or sleeve 430 according to another embodiment of the present disclosure may include indentations 435, 436 configured to be partially cut inward in at least one of an upper end and a lower end of a position where the bridge bus bar unit 120 is accommodated.

For example, as indicated by a circle in FIG. 17, the cell cover or sleeve 430 may include an upper indentation 435 and a lower indentation 436 in two places at the upper end and lower end of the center.

In addition, referring to FIGS. 19 to 20, in the bridge bus bar unit 120, an upper surface portion of the bus bar housing 121 is lower than the upper edge portion E1 of the first and second pouch-type battery cells 110A, 110B. Thus, when the bridge bus bar unit 120 is accommodated in the cell cover or sleeve 430, the upper surface portion of the bus bar housing 121 may be configured not to protrude above the upper indentation 435, and the lower surface portion of the bus bar housing 121 may be configured not to protrude below the lower indentation 436. Therefore, the cell assembly 400 according to the present embodiment may be provided in a form where the central region in which the bridge bus bar unit 120 is located is recessed inward.

In addition, unlike the upper indentation 135 of the cell cover or sleeve 130 described above, the upper indentation 435 of the cell cover or sleeve 430 according to this embodiment may be configured such that only the bent upper end 123a of the bus bar 123 is exposed in the upper direction, and a direction (−X direction) toward the first pouch-type battery cell 110A and a direction (+X direction) toward the second pouch-type battery cell 110B are blocked by screen plates 435a, 435b, as shown in FIG. 19. Here, the screen plates 435a, 435b may be configured such that lower ends thereof are fitted into the upper surface of the bus bar housing 121.

According to this configuration, the internal space of the cell cover or sleeve 430 may be physically separated from the left space and the right space with respect to the bridge bus bar unit 120, so that airtightness may be increased. Therefore, when assembling a battery pack using the cell assemblies 400, the cell assembly 400 may be disposed such that the open surface of the cell cover or sleeve 430 faces the bottom plate 21B of the pack tray 21 to shield the open surface of the cell cover or sleeve 430. In this case, since the movement of ignition sources such as gas, heat, sparks, or the like between the first pouch-type battery cell 110A and the second pouch-type battery cell 110B accommodated in the cell cover or sleeve 430 is limited in a situation where a thermal event occurs, it is possible to block or delay the propagation of thermal runaway between the first pouch-type battery cell 110A and the second pouch-type battery cell 110B.

Figure 21:
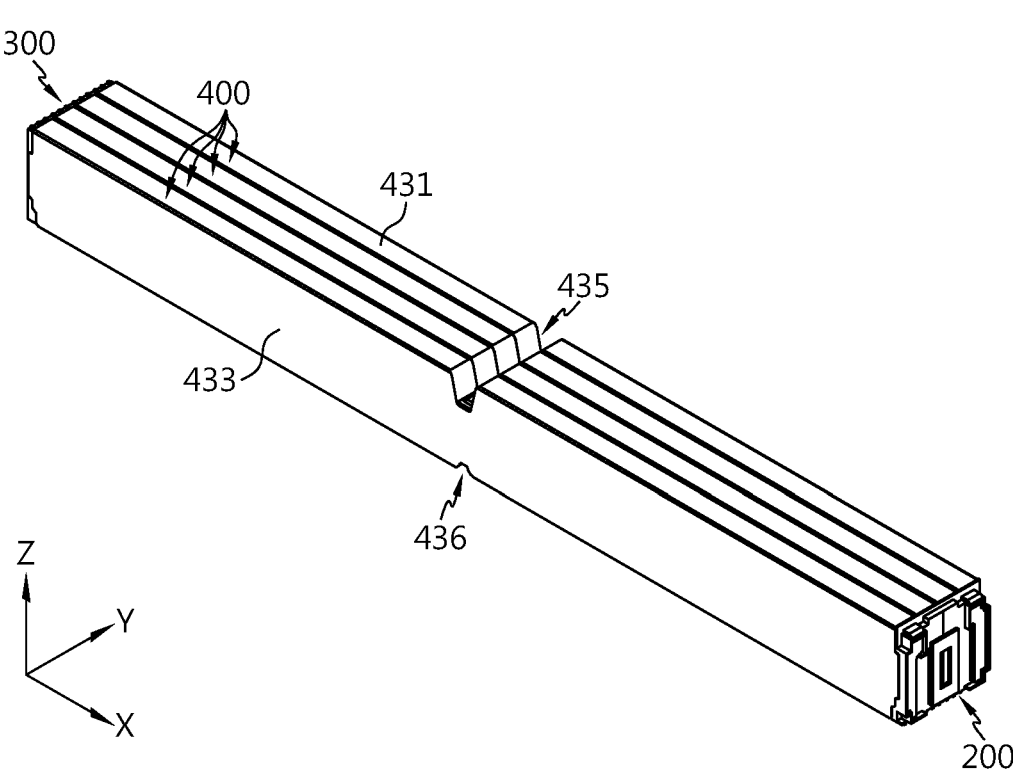
FIG. 21 is a perspective view of one cell assembly group configured by stacking four cell assemblies according to another embodiment of the present disclosure.
Figure 22:
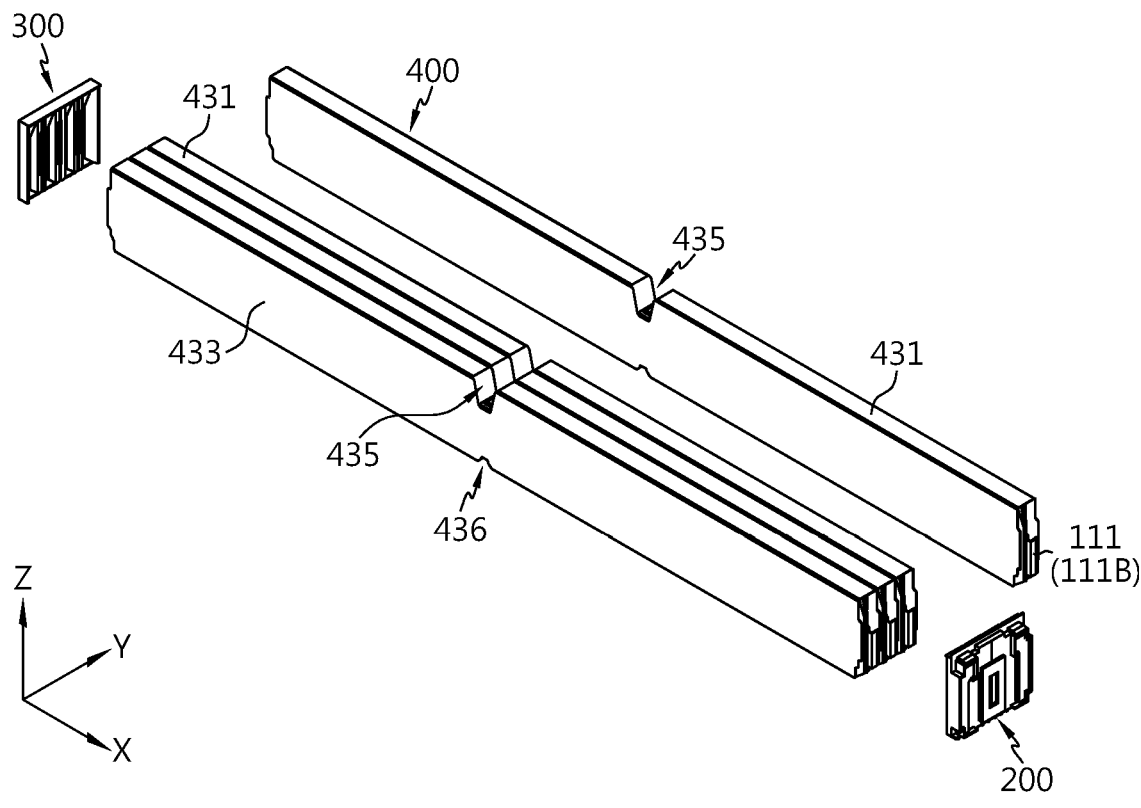
FIG. 22 is a partially exploded perspective view of the cell assembly group of FIG. 21.
Figure 23:
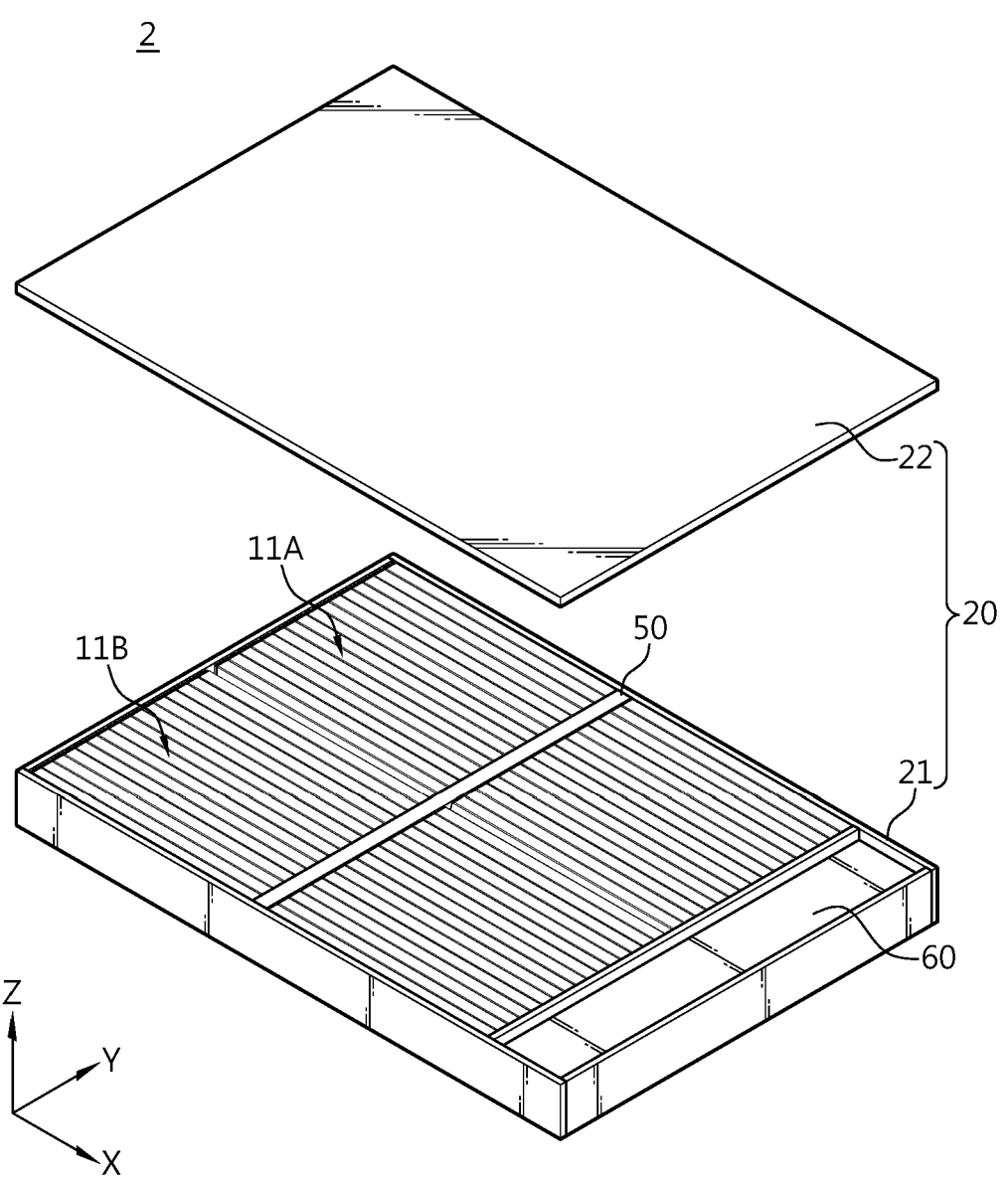
FIG. 23 is a perspective view schematically illustrating a configuration of a battery pack according to another embodiment of the present disclosure.
Figure 24:
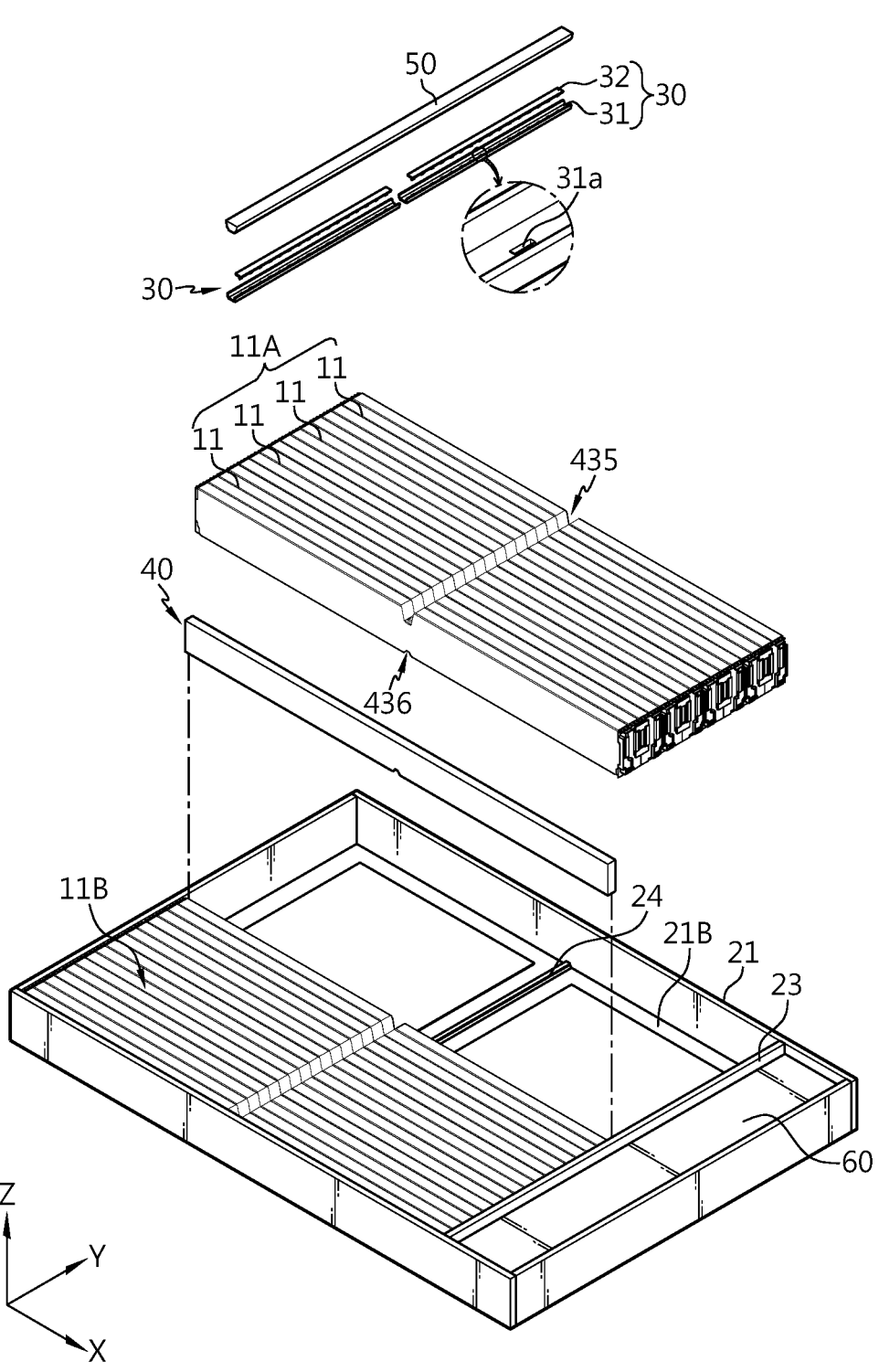
FIG. 24 is a view illustrating separated main components in a battery pack according to another embodiment of the present disclosure.

Meanwhile, a plurality of cell assemblies 400 according to another embodiment of the present disclosure may be stacked in one direction to form a cell assembly group 11 as shown in FIGS. 21 to 22. In this case, the cell assembly group 11 may have a valley shape at regions in which the upper indentation 435 and the lower indentation 436 are connected in one direction (±Y direction). As shown in FIGS. 23 to 24, the space ensured in the cell assembly 400 in this valley-shaped configuration may be used as an installation space for the voltage sensing unit 30, the second cross beam 50, and the third cross beam 24 when assembling the battery pack 2.

The plurality of cell assembly groups 11 may be referred to as an assemblage of the above-described cell assemblies 400, and may be accommodated in the pack case 20, for example, as shown in FIGS. 23 and 24. In this embodiment, the plurality of cell assembly groups 11 may be divided into a first cell assembly group 11A and a second cell assembly group 11B. It can be seen that the division of the plurality of cell assembly groups 11 into the first cell assembly group 11A and the second cell assembly group 11B is for convenience of distinguishing between those located in the +Y axis direction and those located in the −Y axis direction based on the first cross beam 40 of the pack tray 21 in FIGS. 23 to 24.

Figure 25:
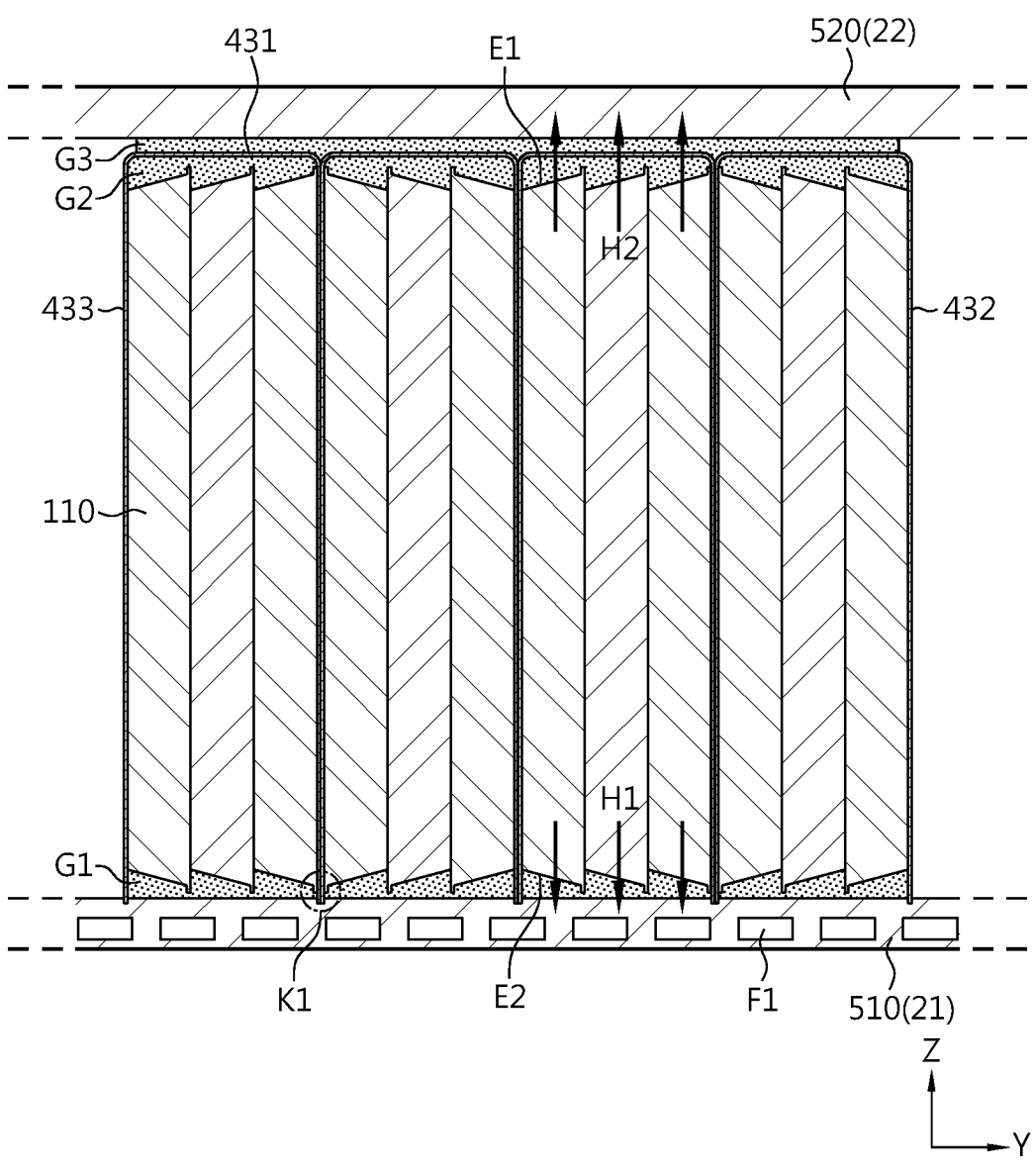
FIG. 25 is a view schematically illustrating a cooling configuration of a battery pack according to another embodiment of the present disclosure.

FIG. 25 is a view schematically illustrating a cooling configuration of a battery pack according to another embodiment of the present disclosure.

The pack case 20 of the battery pack according to another embodiment of the present disclosure may be configured to include a heatsink. Here, the heatsink refers to an object that absorbs and radiates heat from other objects through direct or indirect thermal contact. The pack case 20 may serve as a heatsink in itself, or may be configured in a form in which a heatsink having a flow path F1 is provided inside or outside to allow cooling water to flow.

In this embodiment, the heatsink may include an upper heatsink 520 and a lower heatsink 510, and as shown in FIG. 25, the upper heatsink 520 may be provided in the pack cover 22 and the lower heatsink 510 may be provided in the pack tray 21.

In addition, the cell cover or sleeve 430 may be configured to be seated on the bottom plate 21B of the pack tray 21 in a form in which the lower ends of the first side cover or sleeve 432 and the second side cover or sleeve 433 are fitted into the lower heatsink 510. For example, as indicated by 'K1' in FIG. 25, the lower end of each cell cover or sleeve 430 may be partially fitted into the lower heatsink 510 to be fastened and fixed, and the upper heatsink 520 and the upper cover or sleeve 431 of the cell cover or sleeve 430 may be disposed to face each other.

In addition, thermal resins G1, G2 may be provided in the lower edge portion E2 and the upper edge portion E1 of the pouch-type battery cell 110 inside the cell cover or sleeve 430, respectively. Also, a thermal resin G3 may be provided between the upper cover or sleeve 431 and the upper heatsink 520 from the outside of the cell cover or sleeve 430.

According to the above configuration, the heat generated from each cell assembly 400 may be radiated not only to the lower edge portion E2 of the pouch-type battery cell 110→the thermal resin G1→the lower heatsink 510 as indicated by 'H1' in FIG. 25, but also to the upper edge portion E1 of the pouch-type battery cell 110→the thermal resin G2→the upper cover or sleeve 431 of the cell cover or sleeve 430→the thermal resin G3→the upper heatsink 520 as indicated by 'H2' in FIG. 25. As described above, the battery pack of the present disclosure may perform dual cooling in which the heat of the pouch-type battery cells 110 is conducted to the lower heatsink 510 and the upper heatsink 520 to be cooled.

In particular, when compared with a battery pack including a conventional battery module, the battery pack of the present disclosure has a configuration in which the lower edge portion E2 of the pouch-type battery cells directly faces the lower heatsink 510 and the cell cover or sleeve 430 is seated on the lower heatsink 510, and thus there are no thermal contact resistance elements (such as a module case of a battery module) between the heatsinks in the pouch-type battery cells, and the heat conduction distance is short, thereby further improving cooling performance.

In addition, since the cell cover or sleeve 430, the pouch-type battery cells 110 inside the cell cover or sleeve 430, and the pack case 20 are fixed to each other by thermal resins G1, G2, G3, the cell assemblies 400 may be stably assembled and fixed to the pack case 20 without using fastening components such as bolts, rivets, or the like.

Figure 26:
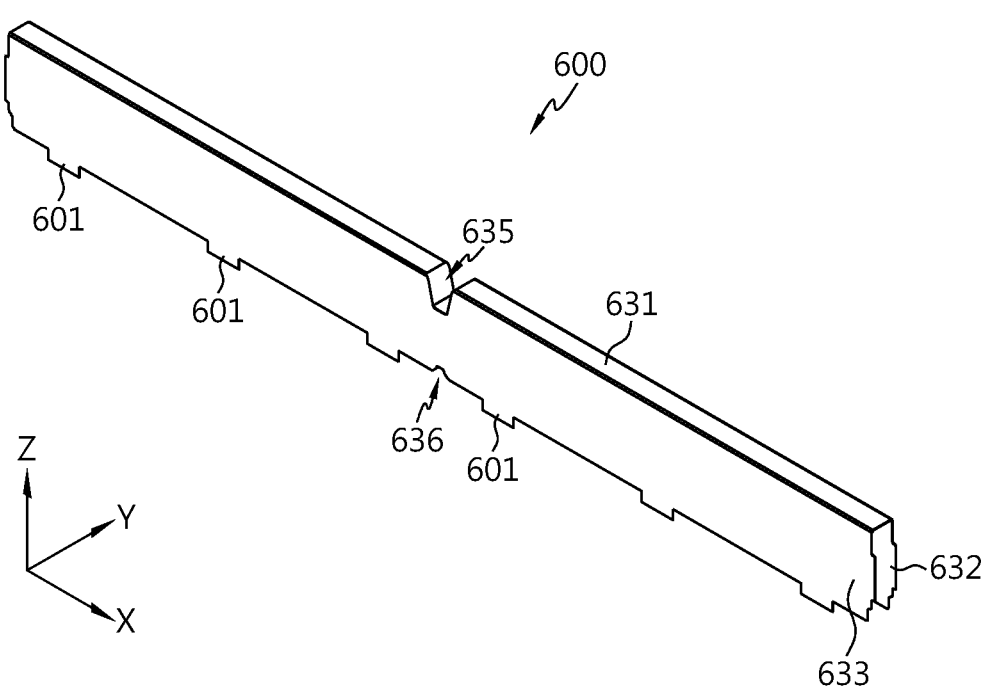
FIG. 26 is a view illustrating a modified example of a cell cover or sleeve in a battery pack according to another embodiment of the present disclosure.
Figure 27:
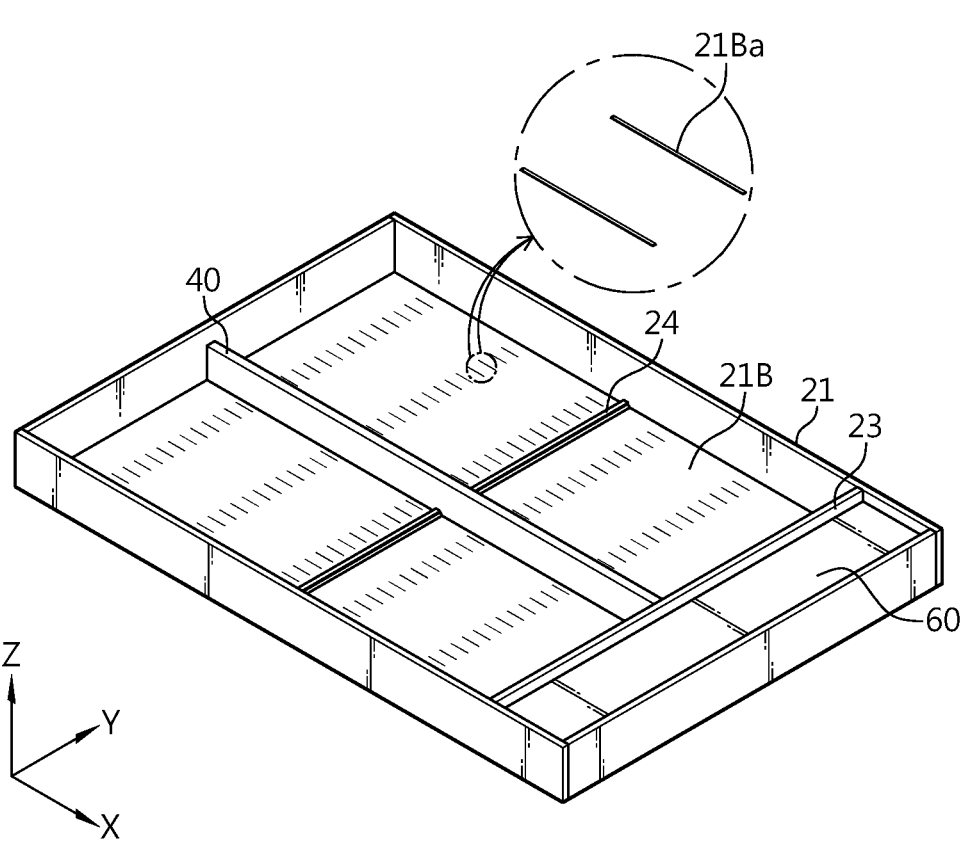
FIG. 27 is a view illustrating a modified example of a pack tray in a battery pack according to another embodiment of the present disclosure.

FIG. 26 is a view illustrating a modified example of a cell cover or sleeve in a battery pack according to another embodiment of the present disclosure, and FIG. 27 is a view illustrating a modified example of a pack tray in a battery pack according to another embodiment of the present disclosure.

FIGS. 26 and 27 are perspective views schematically illustrating the configuration of a cell cover or sleeve 600 and a pack tray 21 according to another embodiment of the present disclosure, respectively. A detailed description of the same or similar parts to the above-described embodiments will be omitted, and the parts having differences will be mainly described.

The cell cover or sleeve 600 according to the modified example, similarly to the above-described embodiment, includes an upper cover or sleeve 631, a first side cover or sleeve 632, a second side cover or sleeve portion 633, an upper indentation 635, and a lower indentation 636. Furthermore, as shown in FIG. 26, the cell cover or sleeve 600 further includes a protrusion 601 at the lower end of at least one of the first side cover or sleeve 632 and the second side cover or sleeve 633. The protrusion 601 may be provided to extend relatively longer in the lower direction from the lower end of the cell cover or sleeve 600.

The protrusion 601 may be provided in plural. For example, as shown in FIG. 26, a plurality of protrusions 601, for example six protrusions 601, may be provided at the lower end of the first side cover or sleeve 632 and/or the second side cover or sleeve 633 along the longitudinal direction of the cell cover or sleeve 600.

In the embodiment in which the cell cover or sleeve 600 as configured above is provided, the pack tray 21 may have a coupling groove 21Ba configured to allow the protrusion 601 to be inserted as shown in FIG. 27. Here, the coupling groove 21Ba may be formed in a position and shape corresponding to the protrusion 601. For example, referring to the embodiment of FIG. 27, the coupling groove 21Ba may be formed in a position and shape corresponding to the protrusion 601 of the cell cover or sleeve 600 at the bottom plate 21B of the pack tray on which the cell cover or sleeve 600 is seated. Moreover, one or more protrusions 601 may be fitted in one coupling groove 21Ba. For example, two protrusions 601 may be inserted into the coupling groove 21Ba of the central portion such as the portion indicated by 'K1' in FIG. 25. On the other hand, in the pack tray 21, one protrusion 601 may be inserted into the coupling groove 21Ba located at the outermost side in the stacking direction of the cell cover or sleeve 600. For example, in the configuration of FIG. 27, one protrusion 601 may be inserted into each of the coupling grooves 21Ba positioned at the leftmost and rightmost sides among the plurality of coupling grooves 21Ba arranged in the left and right direction.

According to this embodiment of the present disclosure, the coupling between the cell cover or sleeve 600 and the pack tray 21 may be further improved. Therefore, even in a situation where vibration or shock is applied to the battery pack or swelling occurs at the pouch-type battery cell 110, the stacking state of the cell cover or sleeve 600 and the pouch-type battery cell 110 accommodated therein may be stably maintained. Moreover, according to this embodiment, it is possible to prevent the cell cover or sleeve 600 from moving in the front and rear direction (X-axis direction). In addition, according to this embodiment, it is possible to prevent the cell cover or sleeve 600 from moving in the left and right direction (Y-axis direction), and effectively prevent the first side cover or sleeve 632 and the second side cover or sleeve 633 from being separated.

Figure 28:
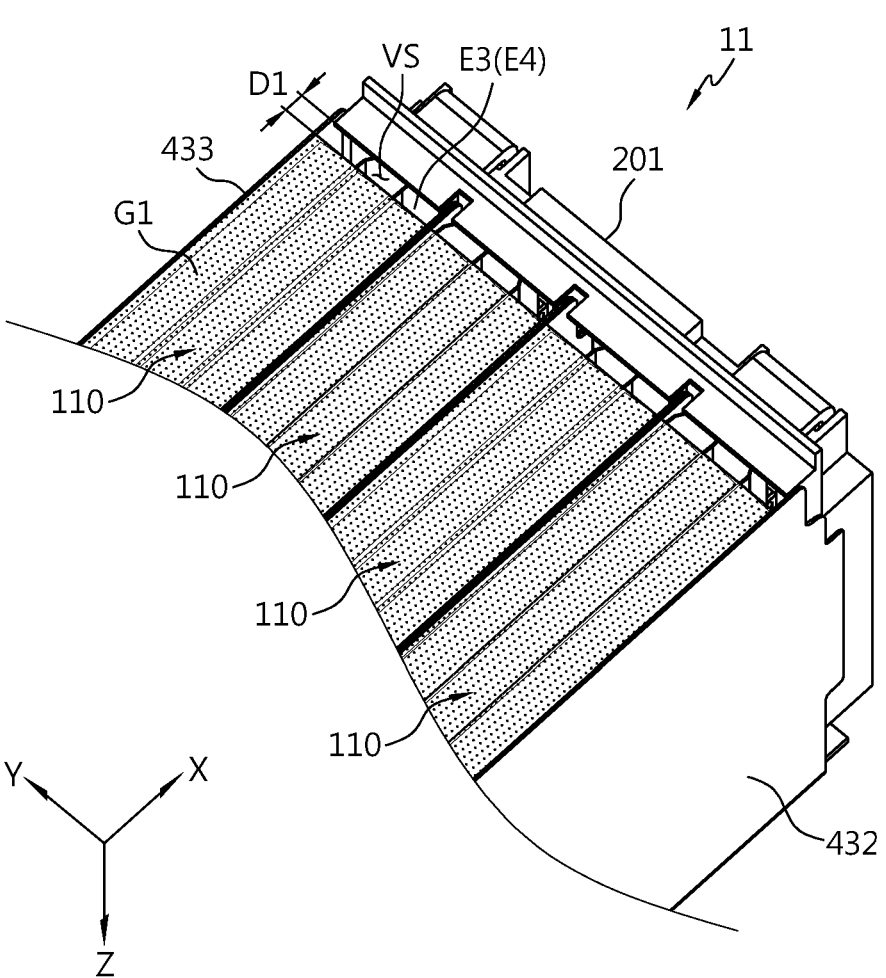
FIG. 28 is a view illustrating one end region of a cell assembly group in a battery pack according to another embodiment of the present disclosure as viewed from the bottom.
Figure 29:
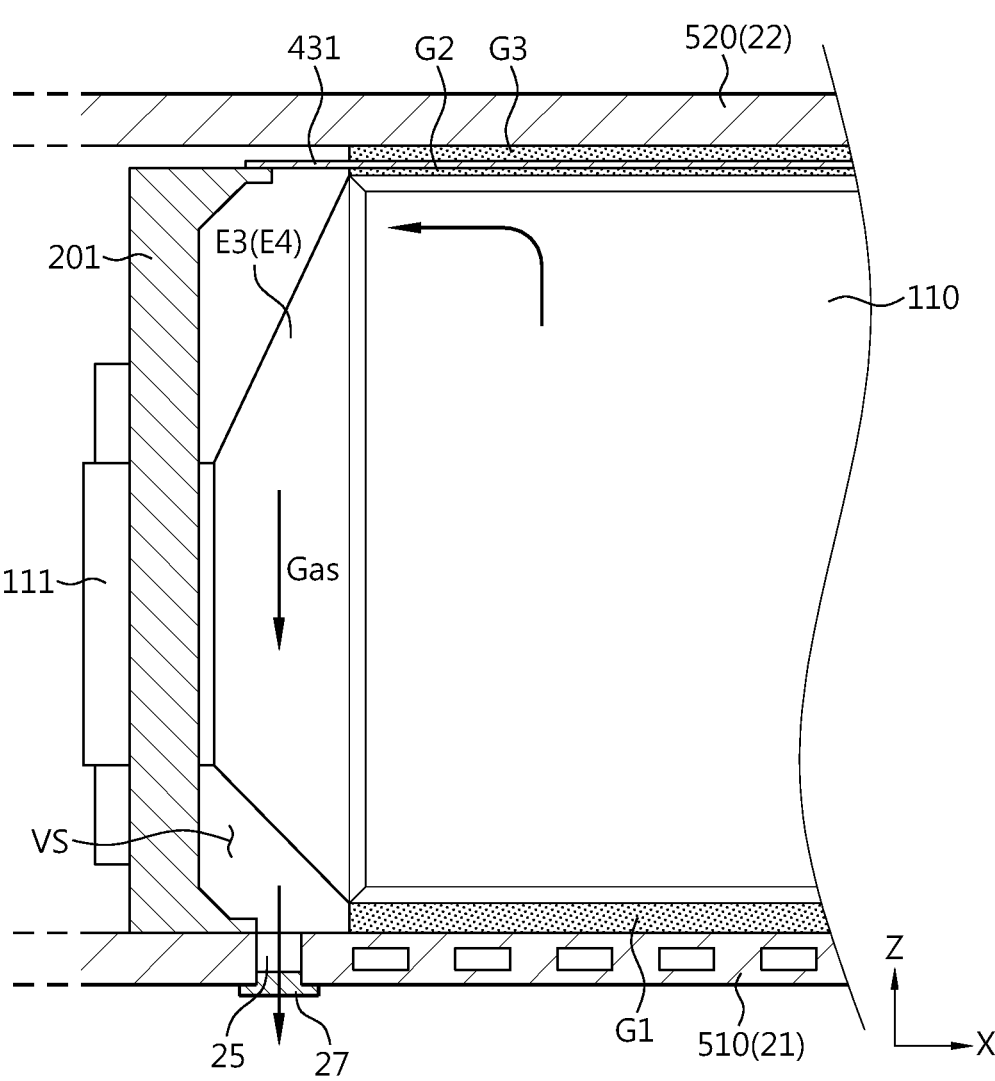
FIG. 29 is a view schematically illustrating a gas venting configuration of a battery pack according to another embodiment of the present disclosure.

FIG. 28 is a view illustrating one end region of a cell assembly group in a battery pack according to another embodiment of the present disclosure as viewed from the bottom, and FIG. 29 is a view schematically illustrating a gas venting configuration of a battery pack according to another embodiment of the present disclosure.

Next, when a thermal event occurs in the battery pack according to another embodiment of the present disclosure, a directional venting configuration of gas, flame/spark, or the like will be described with reference to FIGS. 28 and 29.

The cell assembly 400 according to the present embodiment includes a directional venting space VS inside the cell cover or sleeve 430. The directional venting space VS may be provided at one or both ends of the cell cover or sleeves 430 in the longitudinal direction.

In the case of the pouch-type battery cell 110, the sealing portion from which the electrode lead 111 is drawn out, that is, the front edge portion E3 or the rear edge portion E4 is relatively thinner than the accommodation portion R, and thus a surplus space is present in the front portion (rear portion) of the cell cover or sleeve surrounding the front edge portion E3 or the rear edge portion E4. The surplus space inside the cell cover or sleeve may be used as the directional venting space VS. As shown in FIG. 28, the cell cover or sleeves 430 of each cell assembly 400 may be partially fitted to the outer bus bar housing 201 so that the directional venting space VS is left as indicated by 'D1' in the drawing. In this case, the directional venting space VS may have a blocked structure except for one direction.

Meanwhile, as described above, in the cell assembly 400 according to the present embodiment, the thermal resins G1, G2, G3 are applied to the upper edge portion E1 and the lower edge portion E2 of the pouch-type battery cells for cooling and fixing the pouch-type battery cells 110. At this time, as shown in FIG. 28, in particular, the thermal resin G1 applied to the open surface of the cell cover or sleeve 430 is applied only just before the directional venting space VS. That is, in the cell assembly 400 according to the present embodiment, the thermal resins G1, G2, G3 are applied only to the upper and/or lower portions of the accommodation portion R of the pouch-type battery cell 110, and the thermal resin G1 is not applied to the front edge portion E3 and/or the rear edge portion E4 serving as a sealing portion from which the electrode lead 111 is drawn out.

Therefore, in the directional venting space VS according to this embodiment, the upper direction (Z direction) is blocked by the upper cover or sleeve 431 of the cell cover or sleeve 430, and the front and rear left and right directions (±X, ±Y directions) are blocked by at least one of the outer bus bar housing 201, the accommodation portion R of the pouch-type battery cell 110, the first side cover or sleeve 432 and the second side cover or sleeve 433 of the cell cover or sleeve 430. On the other hand, the lower direction (−Z direction) of the directional venting space VS may communicate with the outside.

According to this configuration, as shown in FIG. 29, when a thermal event occurs and gas or flame/spark (a metal piece deintercalated from the electrode assembly, etc.) is emitted from the pouch-type battery cell 110, the upper cover or sleeve 431 of the cell cover or sleeve 430 may prevent the gas or flame/spark from moving upward. In addition, the outer bus bar housing 201, the first side cover or sleeve 432 and the second side cover or sleeve 433 of the cell cover or sleeve 430 may prevent the gas or flame/spark from moving in the front and rear left and right directions.

Therefore, as shown in FIG. 29, the flow of the gas or flame/spark may be induced downward in the directional venting space VS.

In addition, the pack case 20 may include a gas exhaust port 25 communicating with the directional venting space VS. For example, the gas exhaust port 25 may be provided in the bottom plate 21B corresponding to the vertical lower portion of the directional venting space VS in the pack tray 21. Also, a rupture disk 27 ruptured by a predetermined pressure or heat may be mounted in the gas exhaust port 25. The rupture disk 27 may be formed of a material that is burned out at a gas pressure or a predetermined temperature or higher, for example, a thin aluminum film structure or a plastic resin structure. For reference, in this embodiment, the gas exhaust port 25 is configured to penetrate the bottom plate 21B of the pack tray 21 in the vertical direction, but unlike this embodiment, the gas exhaust port 25 is configured in the form of a channel provided inside the pack tray 21, and the channel may be configured to extend to an opening (not shown) at one side of the pack case 20.

According to the directional venting structure and the pack case structure of the cell assembly, when gas is generated in a specific cell assembly 400 included in the battery pack, the gas in the cell assembly 400 is not propagated to other adjacent cell assemblies 400 but may be discharged in the lower direction of the pack tray 21 in which the corresponding cell assembly 400 is located. Therefore, the battery pack according to the present disclosure has an effect of suppressing or significantly delaying the propagation of thermal runaway of the pouch-type battery cells 110 in a situation where a thermal event occurs.

As described above, according to the present disclosure, a cell assembly implemented in the form of an integrated long cell may be provided by connecting one or more pouch-type battery cells and another one or more pouch-type battery cells in the longitudinal direction using a bridge bus bar unit. In addition, by directly assembling the pouch-type battery cells into the pack case of the battery pack using such a cell assembly, it is possible to maximize the space utilization rate of the battery pack and significantly improve the energy capacity.

On top of the above, according to an embodiment of the present disclosure, it is possible to improve the safety of the battery pack by improving the cooling efficiency of the battery pack and controlling the discharge direction of gas or flame discharged from the pouch-type battery cell.

Meanwhile, the battery pack according to the present disclosure may be used as a power energy source for a vehicle. That is, a vehicle (not shown) according to the present disclosure may include the battery pack 1 according to the present disclosure as described above. Here, the vehicle (not shown) according to the present disclosure may include, for example, a predetermined vehicle (not shown) using electricity as a driving source, such as an electric vehicle or a hybrid electric vehicle. Also, the vehicle according to the present disclosure may further include other various components included in a vehicle, such as a vehicle body, a motor, or the like, in addition to the battery pack according to the present disclosure.

Although terms indicating directions such as 'upper', 'lower', 'left', 'right', 'front', and 'rear' are used in this specification, these terms are only for convenience of description, and it is obvious to those skilled in the art that these terms may vary depending on the location of a target object or the location of an observer.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A cell assembly comprising:
a first cell sleeve;
a first battery cell in a first section of the first cell sleeve;
a second battery cell in a second section of the first cell sleeve,
wherein the first battery cell comprises a first electrode tab at a first side of the first battery cell and a second electrode tab at a second side of the first battery cell, and
wherein the second battery cell comprises a third electrode tab at a first side of the second battery cell and a fourth electrode tab at a second side of the second battery cell; and
a first connector between the first battery cell and the second battery cell, the first connector electrically connecting the second tab of the first battery cell with the third tab of the second battery,
wherein the first connector, the first battery cell, and the second battery cell are arranged linearly in the first sleeve such that the first battery cell and the second battery cell do not overlap with each other.

2. The cell assembly of claim 1, wherein the first cell sleeve comprises a first open end, a second open end, and a third open end,
wherein the first side of the first battery cell is adjacent to the first open end of the first cell sleeve,
wherein the second side of the second battery cell is adjacent to the second open end of the first cell sleeve, and
wherein a third side of the first battery and a third side of the second battery are adjacent to the third open end.

3. The cell assembly of claim 1, wherein the first connector is in a third section of the cell sleeve, and
wherein the third section of the sleeve is between the first section and the second section of the first cell sleeve.

4. The cell assembly of claim 3, wherein the third section of the first cell sleeve comprises a notch.

5. The cell assembly of claim 1, wherein the connector comprises:
a housing comprising a first opening and a second opening, and a third opening; and
a busbar in the housing through the third opening.

6. The cell assembly of claim 5, wherein the second electrode tab of the first battery cell is connected to the first connector through the first opening, and
the third electrode tab of the second battery cell is connected to the first connector through the second opening.

7. The cell assembly of claim 6, wherein the second electrode tab of the first battery cell is electrically connected to the third electrode tab of the second battery cell by the busbar.

8. The cell assembly of claim 1, wherein the first cell sleeve comprises a first surface, a second surface, and a third surface, and
wherein the first cell sleeve comprises a protrusion on an edge of the first surface or the second surface of the first cell sleeve.

9. The cell assembly of claim 1, further comprising:
a second cell sleeve;
a third battery cell in a first section of the second cell sleeve;
a fourth battery cell in a second section of the second cell sleeve;
a second connector between the third battery cell and the fourth battery cell, the second connector electrically connecting the third battery cell and the fourth battery cell;
a third connector on a first end of the first cell sleeve and a first end of the second cell sleeve, the third connector connecting the first battery cell or the second battery cell and the third battery cell or the fourth battery cell.

10. The cell assembly of claim 9, further comprising a third cell sleeve between the first cell sleeve and the second cell sleeve.

11. The cell assembly of claim 9, wherein the first cell sleeve comprises a plurality of first battery cells including the first battery cell and a plurality of second battery cells including the second battery cell, and
wherein the third connector electrically connects the plurality of first battery cells together.

12. A battery pack comprising:
a case having an inner surface;
a plurality of cell assemblies on the inner surface, each of the plurality of cell assemblies comprising the cell assembly of claim 1; and
a voltage sensor on the plurality of cell assemblies, the voltage sensor being electrically connected to the first connector in each of the plurality of cell assemblies; and
a cover covering the plurality of cell assemblies.

13. The battery pack according to claim 12, wherein the case comprises a beam on the inner surface,
wherein the first cell sleeve of each of the plurality of cell assemblies comprises a notch in a third section of the first cell sleeve, and
wherein the notch is coupled to the beam.

14. The battery pack according to claim 12, wherein the voltage sensor comprises:
a sensing frame;
a sensing hole on the sensing frame; and
a sensing circuit board on the sensing frame,
wherein the sensing circuit board comprises a sensing terminal connected to the first connector through the sensing hole.

15. The battery pack according to claim 12, further comprising:
a first heat sink on the case;
a first thermal resin between the heatsink and the plurality of cell assemblies;
a second heat sink on the cover; and
a second thermal resin between the heatsink and the plurality of cell assemblies.

16. The battery pack according to claim 12, further comprising a plurality of openings,
wherein the first cell sleeve of each of the plurality of cell assemblies comprises a protrusion, and
wherein the protrusion of the first cell sleeve of each of the plurality of cell assemblies is coupled to the plurality of openings.

17. The battery pack according to claim 12, further comprising:
a gas exhaust port on the case; and
a rupture disk coupled to the gas exhaust port.

18. A vehicle comprising the battery pack of claim 12.

19. A method of manufacturing a cell assembly, the method comprising the steps of:

electrically connecting a tab of a first battery cell and a tab of a second battery cell with a connector such that the connector is between the first battery cell and the second battery cell; and arranging the connector, the first battery cell, and the second battery cell linearly in a cell sleeve such that the first battery cell and the second battery cell do not overlap with each other.

* * * * *